US 11,885,826 B2

(12) United States Patent
Onoki et al.

(10) Patent No.: US 11,885,826 B2
(45) Date of Patent: Jan. 30, 2024

(54) BIOCHEMICAL ANALYSIS APPARATUS AND BIOCHEMICAL ANALYSIS METHOD

(71) Applicant: SHIMADZU CORPORATION, Kyoto (JP)

(72) Inventors: Takanori Onoki, Kyoto (JP); Kiyohiro Sugiyama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 334 days.

(21) Appl. No.: 17/118,833

(22) Filed: Dec. 11, 2020

(65) Prior Publication Data

US 2021/0181224 A1 Jun. 17, 2021

(30) Foreign Application Priority Data

Dec. 12, 2019 (JP) ................. 2019-224701

(51) Int. Cl.
*G01N 35/10* (2006.01)
*G01N 35/00* (2006.01)
*G01N 35/02* (2006.01)
*G01N 35/04* (2006.01)

(52) U.S. Cl.
CPC ..... *G01N 35/1079* (2013.01); *G01N 35/0099* (2013.01); *G01N 35/025* (2013.01); *G01N 35/1002* (2013.01); *G01N 35/1011* (2013.01); *G01N 2035/0444* (2013.01); *G01N 2035/1025* (2013.01)

(58) Field of Classification Search
CPC ........... G01N 35/1079; G01N 35/0099; G01N 35/025; G01N 35/1002; G01N 35/1011; G01N 2035/0444; G01N 2035/1025; G01N 35/00722; G01N 2035/009; G01N 2035/1013
See application file for complete search history.

(56) References Cited

U.S. PATENT DOCUMENTS

| 8,357,537 B2 * | 1/2013 | Blecka ................. G01N 35/025 |
| | | 422/68.1 |
| 2009/0226344 A1 | 9/2009 | Nishida et al. |
| 2012/0045366 A1 | 2/2012 | Katsumi et al. |
| 2013/0243653 A1 * | 9/2013 | Koiso ................ G01N 35/1011 |
| | | 422/68.1 |
| 2014/0178251 A1 * | 6/2014 | Yamada ............. G01N 35/1079 |
| | | 422/67 |

FOREIGN PATENT DOCUMENTS

| JP | 2004-239844 A | 8/2004 |
| JP | 2009-210373 A | 9/2009 |
| JP | 2012-042294 A | 3/2012 |
| JP | 2015219023 A | * 12/2015 |

* cited by examiner

*Primary Examiner* — Jill A Warden
*Assistant Examiner* — John McGuirk
(74) *Attorney, Agent, or Firm* — Sughrue Mion, PLLC

(57) ABSTRACT

A biochemical analysis apparatus includes a piercer for piercing a cover member, a nozzle that passes through the piercer which has pierced the cover member and suctions a specimen, a liquid surface sensor that detects contact of the nozzle with the specimen, and a controller that drives the nozzle and the piercer, in which the controller provides an error notification upon detection of contact of the nozzle with the accommodation object inside the piercer, and upon detection of a collision of the nozzle with the cover member.

13 Claims, 32 Drawing Sheets

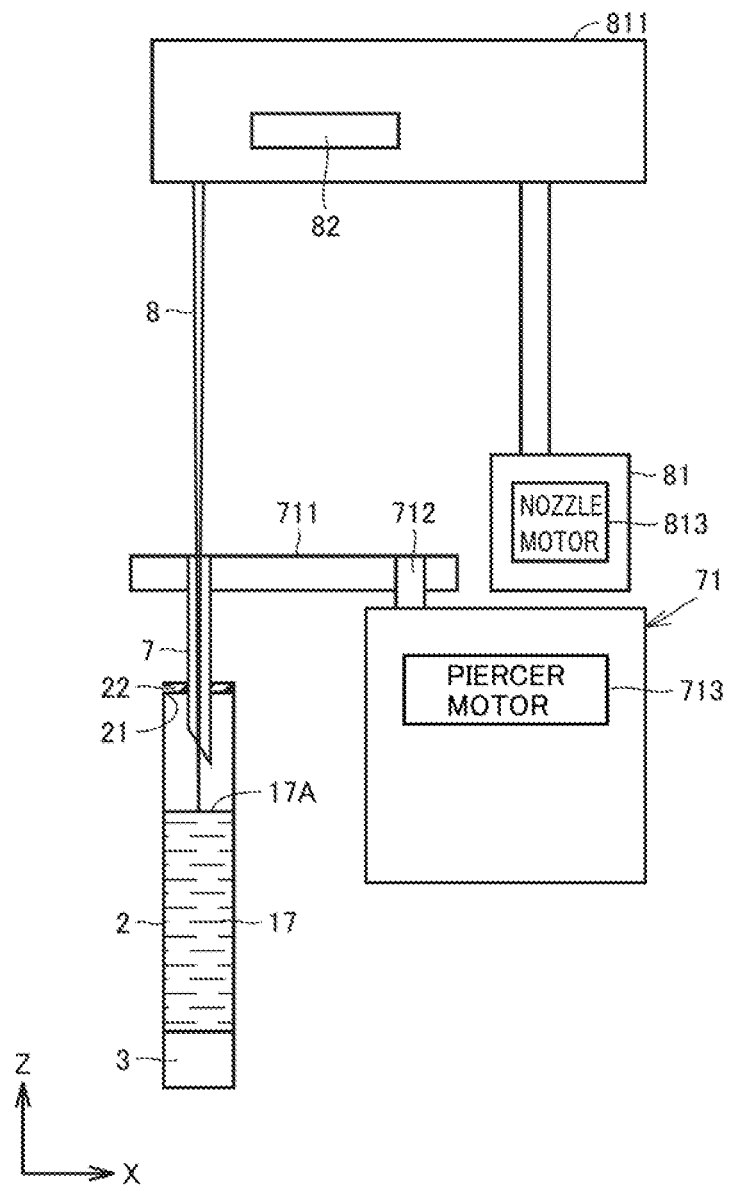

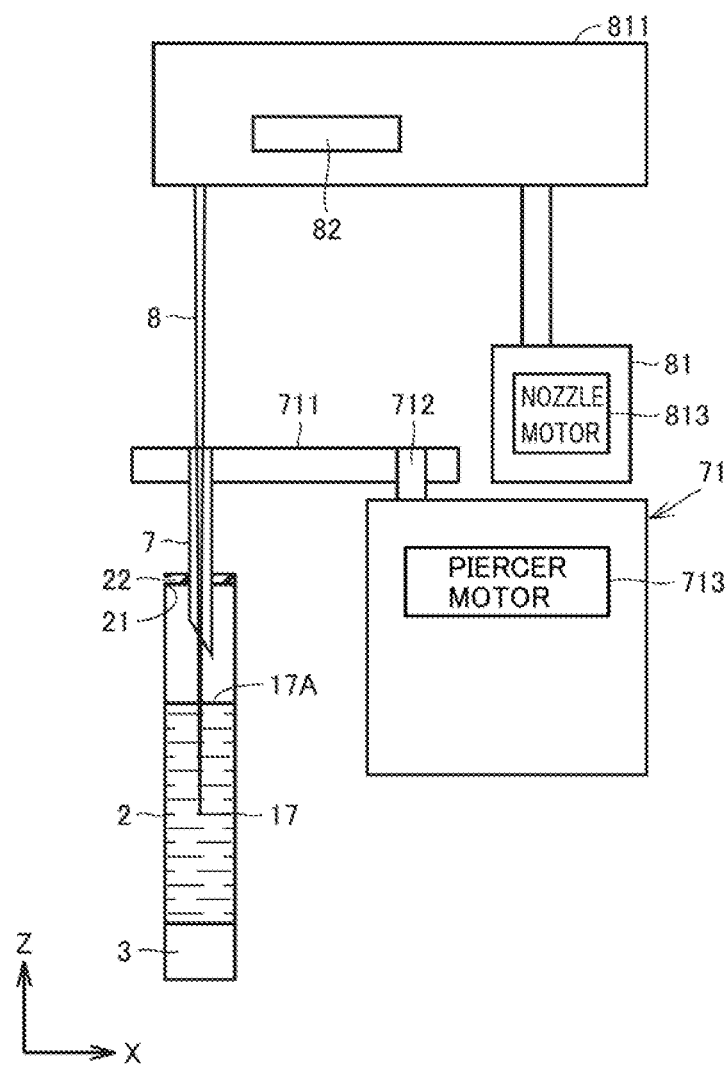

FIG.10

| | TYPE OF COVER MEMBER | |
|---|---|---|
| | FIRST COVER MEMBER (MORE EXTENSIBLE) | SECOND COVER MEMBER (LESS EXTENSIBLE) |
| PULSE NUMBER BY WHICH DETECTION OF COLLISION WITH COVER MEMBER IS DETERMINED | P1 | P2 |

※P1>P2

5341

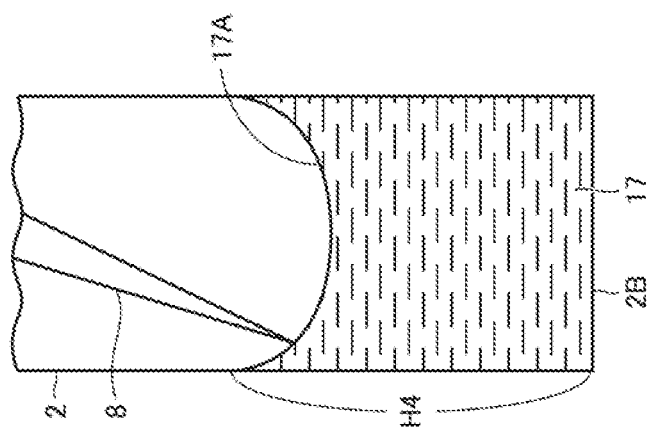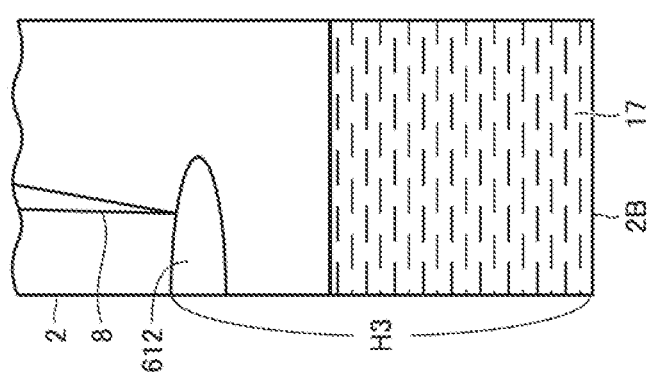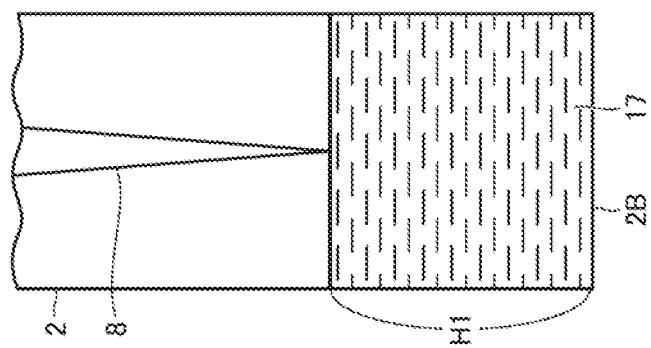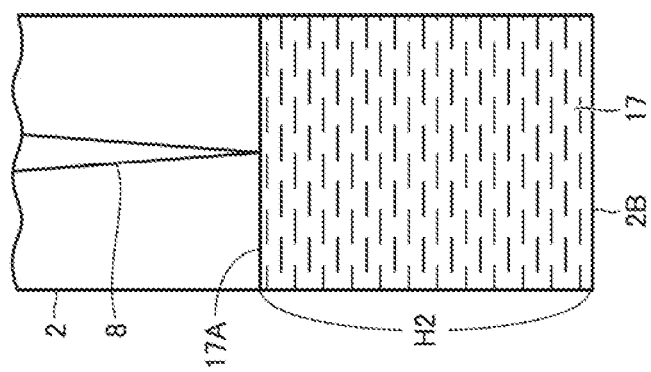

FIG.17

| SID REQUEST No. | SPECIMEN | DATE AND TIME OF RACK REQUEST | STATUS | ANALYSIS CATEGORY | | | | |
|---|---|---|---|---|---|---|---|---|
| | | | | A | B | C | D | |
| Request-0002 No.0002 | S1 | S001-02 04/19 14:26 | S.UP X | | | | | |
| Request-0003 No.0003 | S2 | S001-04 04/19 14:26 | S.UP X | | | | | |
| Request-0004 No.0004 | S3 | S002-02 04/19 14:33 | | | | | | |
| Request-0005 No.0005 | S4 | S002-04 04/19 14:33 | | | | | | |
| Request-0006 No.0006 | S5 | S006-02 04/19 14:33 | | | | | | |
| Request-0007 No.0007 | S6 | S006-04 04/19 14:33 | | | | | | |
| Request-0010 No.0010 | S7 | P102-02 04/19 14:59 | S.UP X | | | | | |
| Request-0011 No.0011 | S8 | P102-04 04/19 14:59 | P.MISTAKE X | | | | | |
| Request-0010 No.0012 | S7 | P102-02 04/19 15:05 | | | | | | |
| Request-0011 No.0013 | S8 | P102-04 04/19 15:06 | P.MISTAKE X | | | | | |

- REQUEST LIST — 906
- DATA LIST — 908
- ERROR — 910

FIG.18

| SID | | SPECIMEN | RACK | ANALYSIS CATEGORY | | | | REQUEST LIST |
|---|---|---|---|---|---|---|---|---|
| | | | | A | B | C | D | |
| | | | | | | | | DATA LIST |
| | | | | | | | | ERROR |
| Request-0010 2019/04/19 15:05:46 | | S7 S-UP-X | P102-02 | A10 | S-UP | S-UP | S-UP | |
| Request-0011 2019/04/19 15:06:39 | | S8 P-MISTAKE-X | P102-04 | A11 | P-MISTAKE | UNEXAMINED | UNEXAMINED | |
| Request-0010 2019/04/19 15:17:08 | | S7 | P102-02 | A12 REEXAMINED | B12 REEXAMINED | C12 REEXAMINED | D12 REEXAMINED | |
| Request-0011 2019/04/19 15:08:07 | | S8 P-MISTAKE-X | P102-04 | A13 | P-MISTAKE REEXAMINED | UNEXAMINED | UNEXAMINED | |

FIG.19

| TYPE OF ERROR MESSAGE | CONTENT OF MESSAGE |
|---|---|
| FIRST ERROR MESSAGE | A SAMPLE HAS BEEN DETECTED BY A NOZZLE INSIDE A PIERCER |
| SECOND ERROR MESSAGE | A COLLISION OF A NOZZLE WITH A COVER MEMBER HAS BEEN DETECTED |
| THIRD ERROR MESSAGE | A LIQUID SURFACE HAS BEEN DETECTED ABOVE THE PREVIOUS HEIGHT |
| FOURTH ERROR MESSAGE | A LIQUID SURFACE HAS BEEN DETECTED AT A POSITION ABOVE AN UPPER LIMIT |
| FIFTH ERROR MESSAGE | A LIQUID SURFACE HAS BEEN DETECTED AT A POSITION BELOW A LOWER LIMIT |

FIG.31

|  | TYPE OF COVER MEMBER ||
|  | FIRST COVER MEMBER (MORE EXTENSIBLE) | SECOND COVER MEMBER (LESS EXTENSIBLE) |
| --- | --- | --- |
| ADDITIONAL PULSE | P2 | P1 |
| ※P2>P1 |||

5342

BIOCHEMICAL ANALYSIS APPARATUS AND BIOCHEMICAL ANALYSIS METHOD

BACKGROUND OF THE INVENTION

Field of the Invention

The present invention relates to a biochemical analysis apparatus and a biochemical analysis method.

Description of the Background Art

A conventionally known analysis apparatus performs a biochemical analysis of a specimen by reacting the specimen and a reagent in a reaction container. An analysis apparatus disclosed in Japanese Patent Laying-Open No. 2012-42294 includes an accommodation container that accommodates a specimen, a nozzle (pipette) for suctioning the specimen, and a sensor. The sensor detects contact of the nozzle with a liquid surface of the specimen. The apparatus disclosed in Japanese Patent Laying-Open No. 2012-42294 causes the nozzle to start a specimen suction process upon detection of the contact of the nozzle with the liquid surface. The analysis apparatus dispenses the specimen to another accommodation container after the suction of the specimen by the nozzle.

SUMMARY OF THE INVENTION

In some cases, an accommodation container that accommodates an accommodation object, which is a specimen or a reagent, has an opening, and the opening is covered with a cover member (cap). In order to suction the accommodation object from such an accommodation container, the following configuration is conceivable. This configuration includes a piercer of cylindrical shape, causes the piercer to pierce the cover member, inserts a nozzle into the piercer which has pierced the cover member, and suctions the accommodation object using the nozzle.

In such a configuration, after the piercer has pierced the cover member, a droplet of the accommodation object may adhere to the inside of the piercer due to, for example, backflow of the accommodation object inside the accommodation container. In this case, if the nozzle contacts the droplet in the piercer, the nozzle may start a suction process. As a result, the nozzle performs the suction process in a location free from the accommodation object, and accordingly, fails to suction the accommodation object. In another case, the piercer fails to pierce the cover member. In this case, the nozzle is not inserted into the accommodation container, and accordingly, fails to suction the accommodation object. The user fails to easily recognize a factor by which the analysis apparatus has failed to suction the accommodation object.

The present disclosure has been made to solve the above problem and has an object to provide technology of causing a user to easily recognize a factor by which an analysis apparatus has failed to suction an accommodation object.

A biochemical analysis apparatus according to an aspect of the present disclosure performs a biochemical analysis of a specimen by reacting the specimen and a reagent in a reaction container. The biochemical analysis apparatus includes: an arrangement portion in which an accommodation container is arranged, the accommodation container accommodating an accommodation object which is the specimen or the reagent and including a cover member; a piercer for piercing the cover member; a nozzle that passes through the piercer which has pierced the cover member and suctions the accommodation object; a first sensor that detects contact of the nozzle with the accommodation object, a second sensor that detects a collision of the nozzle; and a controller that drives the nozzle and the piercer. The controller provides an error notification when the first sensor detects contact of the nozzle with a droplet of the accommodation object inside the piercer, and provides an error notification when the second sensor detects a collision of the nozzle with the cover member.

A biochemical analysis method according to another aspect of the present disclosure performs a biochemical analysis of a specimen by reacting the specimen and a reagent in a reaction container. The biochemical analysis method includes, in an accommodation container accommodating an accommodation object which is the specimen or the reagent and includes a cover member: providing an error notification upon detection of contact of a nozzle with a droplet of the accommodation object in a piercer for piercing the cover member, the nozzle suctioning the accommodation object; and providing an error notification upon detection of a collision of the nozzle with the cover member The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows a state in which the nozzle of the present embodiment is in contact with a liquid surface of a sample.

FIG. 8 shows a state in which the nozzle of the present embodiment is inserted into the sample.

FIG. 10 shows example types of the cover members of the present embodiment.

FIG. 15A shows an example of a previous height, and FIGS. 15B, 15C, and 15D each show an example of the most recent height.

FIG. 16 shows an upper limit and the like.

FIG. 17 shows an example display screen of the present embodiment.

FIG. 18 shows another example display screen of the present embodiment.

FIG. 19 shows an example summary of each error message.

FIG. 31 shows example types of cover members of the present embodiment.

DESCRIPTION OF THE PREFERRED EMBODIMENTS

Figure 1:
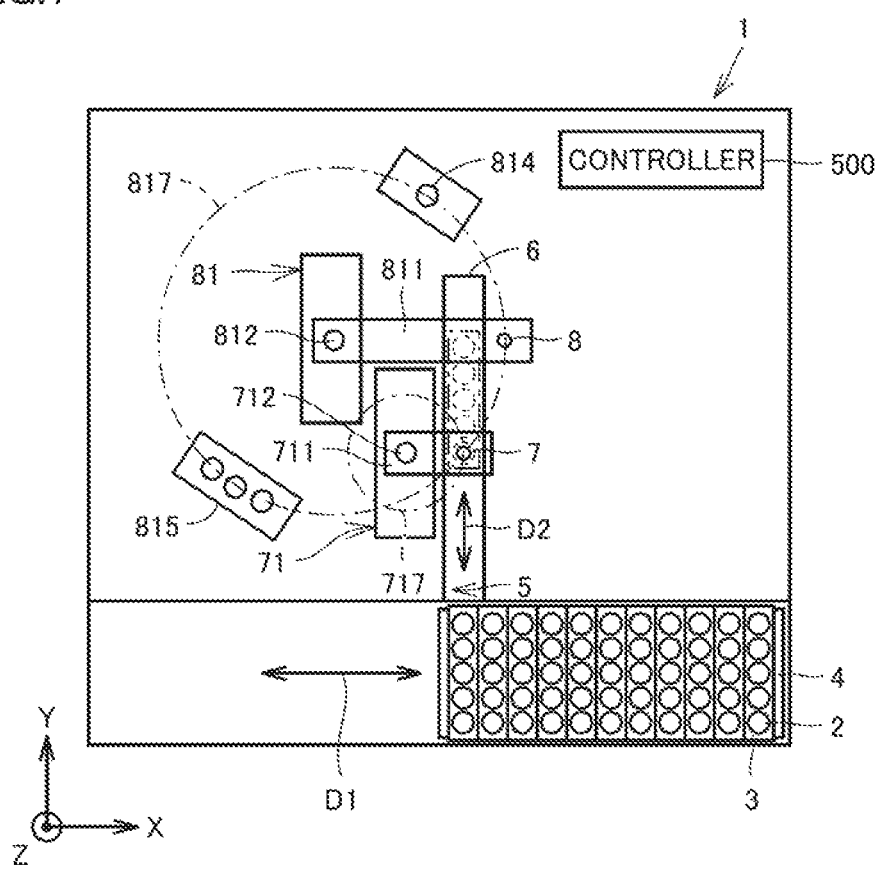
FIG. 1 is a schematic plan view showing an example configuration of main parts of an analysis apparatus of the present embodiment.

The embodiments of the present invention will be described below in detail with reference to the drawings. The same or corresponding parts are designated by the same characters in the drawings and will not be described repeatedly. It has been intended from the time of filing of the present application to appropriately combine at least some of components described in the respective embodiments. In the accompanying drawings, illustrations are not based on the actual dimensional ratio, and there are some parts shown in different dimensional ratios for clearly illustrating the structure in order to allow easy understanding of the structure.

Embodiment 1

[Apparatus Configuration]

A biochemical analysis apparatus (hereinafter, also merely referred to as "analysis apparatus") according to Embodiment 1 is configured to dispense each of a specimen and a reagent into a reaction container using a nozzle and optically determine a state of reaction in the reaction container. Hereinafter, the specimen may be referred to as "sample". The specimen is, for example, a blood component (serum or plasma) or urine. In the present embodiment, the reaction container of the analysis apparatus is a disposable cuvette.

FIG. 1 is a schematic plan view showing an example configuration of main parts of an analysis apparatus 1 according to an embodiment of the present invention. In FIG. 1, the height direction of analysis apparatus 1 is a Z-axis direction, the width direction of analysis apparatus 1 is an X-axis direction, and the depth direction of analysis apparatus 1 is a Y-axis direction. The Z-axis direction is the vertical direction of analysis apparatus 1 as well. Analysis apparatus 1 includes a controller 500 that controls parts of analysis apparatus 1. Although controller 500 is shown on the upper right in FIG. 1 for convenience sake, in actuality, controller 500 is arranged at a position different from that of FIG. 1.

Controller 500 conveys a plurality of accommodation containers 2, each of which accommodates a sample, to prescribed positions. Controller 500 causes the nozzle to suction the sample in each accommodation container 2 and dispenses the sample.

Accommodation container 2 is placed in analysis apparatus 1 while being held by a rack 3. Each rack 3 holds accommodation containers 2. In the example of FIG. 1, five accommodation containers 2 are arranged in one rack 3. Analysis apparatus 1 includes an installation portion 4. Racks 3 are installed in installation portion 4. In the example of FIG. 1, 11 racks are arranged.

Accommodation container 2 typically has a cylindrical shape with an opening. Accommodation containers 2 are classified into accommodation containers, each of which has an opening covered with a cover member, and accommodation containers, each of which has an opening not covered with the cover member. Rack 3 holding accommodation container 2 with its opening covered with the cover member is also referred to as a closed tube sampling (CTS) rack. Also, rack 3 holding accommodation container 2 with its opening not covered with the cover member is referred to as a SAM rack. Each rack 3 is provided with a mark for determining whether it is the CTS rack or SAM rack. This mark is typically a bar code. Analysis apparatus 1 includes a mark sensor 700 (see FIG. 2) that reads the mark. Controller 500 can determine whether rack 3 holding accommodation container 2 that suctions a sample is the CTS rack or SAM rack, based on the result of the detection of mark sensor 700.

Controller 500 moves racks 3 to a conveyance position 5 in a direction D1. Direction D1 is a direction in which racks 3 are arranged. Direction D1 is also the X-axis direction.

Subsequently, controller 500 conveys rack 3 from installation portion 4 in a direction D2. Direction D2 is a direction orthogonal to direction D1. Direction D2 is also the Y-axis direction. In the present embodiment, controller 500 sequentially moves racks 3 one by one to conveyance position 5 in response to, for example, a user's input of a start operation. Controller 500 conveys one rack 3 from conveyance position 5 in direction D2.

Rack 3 conveyed from installation portion 4 is stopped once on a rack conveyance path 6. Controller 500 determines at a prescribed timing whether rack 3 to be processed is the CTS rack or SAM rack. When determining that rack 3 to be processed is the CTS rack, controller 500 suctions a sample using a nozzle 8 from accommodation container 2 held by rack 3 (i.e., CTS rack) after piercing the cover member with a piercer 7. Piercer 7 is shaped to be pointed at its tip. Piercer 7, which perforates the cover member, is also referred to as a "perforation member". In this manner, piercer 7 serves to pierce the cover member.

When determining that rack 3 to be processed is the SAM rack, controller 500 suctions a sample using nozzle 8 from accommodation container 2 held by rack 3 (i.e., SAM rack).

Piercer 7 extends vertically (i.e., in the Z-axis direction). A piercer driving device 71 holds piercer 7 and drives piercer 7 to move piercer 7 upward and downward. Piercer driving device 71 includes a piercer arm 711 running horizontally. Piercer 7 is held at one end of piercer arm 711. A rotary shaft 712 is attached to the other end of piercer arm 711. Piercer arm 711 is rotatable about rotary shaft 712. Piercer driving device 71 can rotate piercer arm 711 about rotary shaft 712 to horizontally move piercer 7 along an arc-shaped trajectory 717. Piercer driving device 71 can also move piercer arm 711 vertically along rotary shaft 712.

Nozzle 8 extends vertically (i.e., in the Z-axis direction). A nozzle driving device 81 holds nozzle 8 and drives nozzle 8 to move nozzle 8 upward and downward. Nozzle driving device 81 includes a nozzle arm 811 running horizontally. Nozzle 8 is held at one end of nozzle arm 811. A rotary shaft 812 is attached to the other end of nozzle arm 811. Nozzle arm 811 is rotatable about rotary shaft 812. Nozzle driving device 81 can rotate nozzle arm 811 about rotary shaft 812 to move nozzle 8 horizontally along an arc-shaped trajectory 817. Nozzle driving device 81 can also move nozzle arm 811 vertically along rotary shaft 812.

In the present embodiment, controller 500 controls piercer driving device 71 to drive piercer 7. Controller 500 also controls nozzle driving device 81 to drive nozzle 8. For example, controller 500 causes piercer 7 to pierce the cover member by a technique shown in FIGS. 4 to 8, which will be described below. Controller 500 inserts nozzle 8 into piercer 7 which has pierced the cover member, thereby moving nozzle 8 downward. Controller 500 suctions the sample of accommodation container 2 using nozzle 8 in the piercer. The suctioned sample is held once in a prescribed location.

Nozzle 8 may suction a reagent before suctioning a sample. In this case, for example, before nozzle 8 suctions the sample, nozzle driving device 81 rotates nozzle arm 811 to move nozzle 8 to above the reagent held by a reagent holding portion 815. Subsequently, nozzle driving device 81 moves nozzle arm 811 vertically downward. Consequently, nozzle 8 is inserted into the reagent, thus allowing nozzle 8 to suction the reagent. In a modification, analysis apparatus 1 may suction a reagent using another nozzle.

Subsequently, nozzle driving device 81 moves nozzle arm 811 vertically upward to withdraw nozzle 8 from the reagent. Controller 500 then performs a sample suction operation shown in FIGS. 4 to 8.

In this manner, piercer 7 is a member for piercing cover member 22. Nozzle 8 is a member that passes through piercer 7 which has pierced cover member 22 and suctions a sample.

Controller 500 withdraws nozzle 8 from accommodation container 2 after suctioning the sample of accommodation container 2 using nozzle 8. Controller 500 then rotates nozzle arm 811 to stop nozzle 8 immediately above a dispensing aperture 814. Dispensing aperture 814 is located on trajectory 817. After nozzle 8 stops immediately above dispensing aperture 814, controller 500 moves nozzle 8 downward. Nozzle 8 is thus inserted into dispensing aperture 814. Controller 500 discharges the held sample with nozzle 8 inserted into dispensing aperture 814, thereby dispensing the sample into dispensing aperture 814. The sample dispensed into dispensing aperture 814 is poured into a cuvette arranged in dispensing aperture 814.

Nozzle 8 is pulled out of accommodation container 2 and out of piercer 7 every time a sample is suctioned. Nozzle 8 is cleaned with a cleaning liquid after dispensing, and then, performs the next sample suctioning operation. When nozzle 8 suctions the sample several times from the same accommodation container 2, nozzle 8 is inserted into the same accommodation container 2 several times. During suctioning of the sample several times from the same accommodation container 2, piercer 7 is kept being inserted into accommodation container 2.

[Hardware Configuration of Analysis Apparatus]

Figure 2:
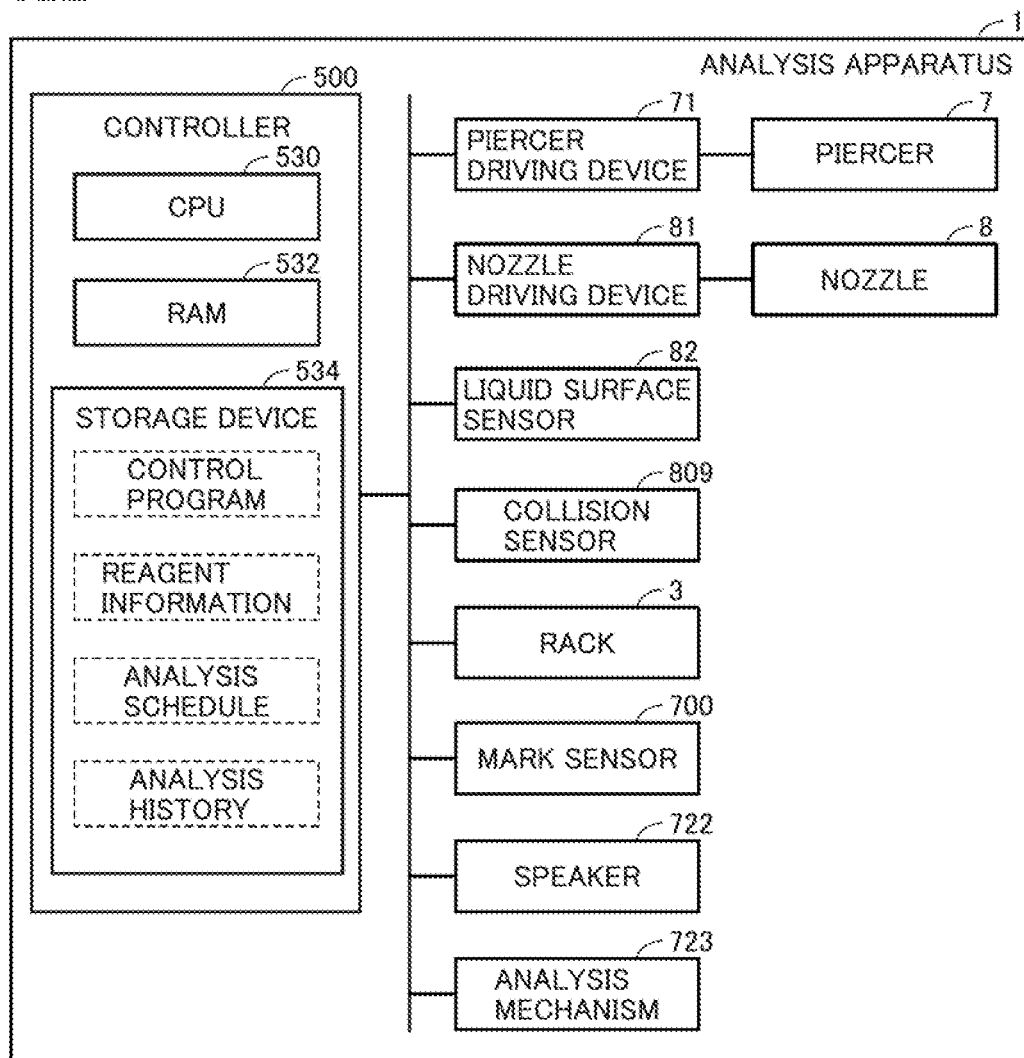
FIG. 2 is a block diagram showing an example hardware configuration of the analysis apparatus of the present embodiment.

Next, a hardware configuration of analysis apparatus 1 will be described. FIG. 2 is a block diagram showing an example hardware configuration of analysis apparatus 1. Controller 500 includes a central processing unit (CPU) 530, a random access memory (RAM) 532, a storage device 534, and an I/O buffer (not shown) for inputting and outputting various signals.

CPU 530 loads a control program stored in storage device 534 to RAM 532 and executes the control program. The control program is a program in which a procedure of various processes executed by controller 500 is described. Storage device 534 stores various pieces of information and data for various processes, in addition to the control program. Controller 500 executes various processes in the analysis apparatus in accordance with the control program and the various pieces of information and data. Note that the processes can be executed by dedicated hardware (electronic circuit), in addition to software.

For example, reagent information, information or data about an analysis schedule, an analysis history, and/or the like are registered with storage device 534, in addition to the control program in which the procedure is described. The reagent information is information about each reagent (e.g., reagent ID, a type, an expiration date, and/or the like of a reagent).

The analysis schedule is determined based on, for example, sample information (e.g., an analysis category of each sample) and the availability of each port in order to efficiently analyze all the scheduled samples. For example, the analysis schedule includes a timing of each of dispensing and measurement, a sample and a reagent to be dispensed, and a photometer port for measurement. The analysis schedule is managed per sample ID (per sample accommodation container).

The analysis history indicates the degree of progress of an analysis including events still in progress, and is updated successively in accordance with the progress of the analysis. The analysis history includes, for example, a path of movement (including a current position) of the cuvette, a sample and a reagent dispensed into the cuvette, a photometer port after a measurement, and a result of the measurement. The analysis history is managed per cuvette. Each of controller 500 and the user can refer to the analysis history to check whether an analysis has been performed (or is in progress) in accordance with the analysis schedule.

Analysis apparatus 1 also includes piercer driving device 71, nozzle driving device 81, a liquid surface sensor 82, a collision sensor 809, and rack 3. Liquid surface sensor 82 and collision sensor 809 will be described below in detail. Nozzle driving device 81 drives nozzle 8. Controller 500 transmits a control signal to piercer driving device 71. Piercer driving device 71 drives piercer 7 based on the control signal from controller 500. Piercer driving device 71 includes a pulse motor. Hereinafter, the pulse motor of piercer driving device 71 is also referred to as "piercer motor 713 (see FIG. 4 and the like)". Controller 500 can determine the position of piercer 7 and control the position of piercer 7, in accordance with a pulse number supplied to the pulse motor of piercer driving device 71. In other words, an amount of driving of piercer 7 corresponds to the pulse number supplied to the pulse motor of piercer driving device 71.

Controller 500 also transmits a control signal to nozzle driving device 81. Nozzle driving device 81 drives nozzle 8 based on the control signal from controller 500. Nozzle driving device 81 includes a pulse motor. The pulse motor of nozzle driving device 81 is also referred to as a "nozzle motor 813 (see FIG. 6 and the like)". Controller 500 can determine the position of nozzle 8 and control the position of nozzle 8, in accordance with a pulse number supplied to the pulse motor of nozzle driving device 81. That is to say, an amount of driving of nozzle 8 corresponds to the pulse number supplied to the pulse motor of nozzle driving device 81.

In this manner, controller 500 drives nozzle 8 and piercer 7. Controller 500 also drives racks 3 as described with reference to FIG. 1. Rack 3 is a member in which accommodation container 2 is arranged. Rack 3 corresponds to an "arrangement portion" of the present disclosure.

[Example Configuration of Analysis System]

Figure 3:
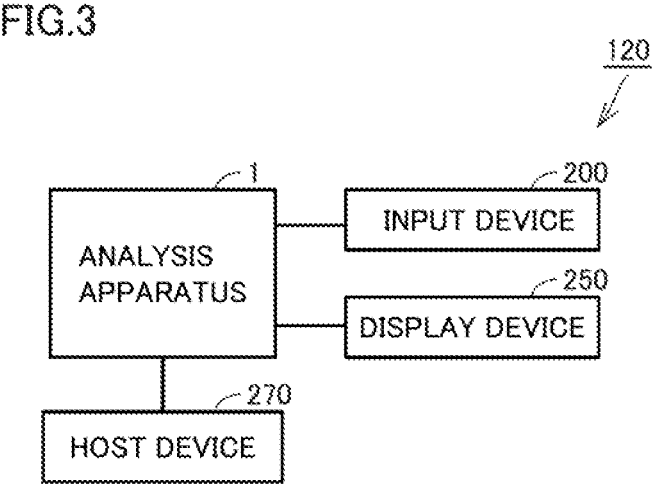
FIG. 3 is a block diagram showing an example configuration of an analysis system of the present embodiment.

Next, an example configuration of an analysis system including analysis apparatus 1 will be described. FIG. 3 is a block diagram showing an example configuration of an analysis system 120. Analysis system 120 in the example of FIG. 3 includes analysis apparatus 1, an input device 200, a display device 250, and a host device 270. Host device 270 corresponds to an "external device" of the present disclosure.

Input device 200 is a device that receives user's inputs of various pieces of information. Input device 200 includes a mouse, a keyboard, and/or the like. The information input through input device 200 is transmitted to analysis apparatus 1. Display device 250 displays various pieces of information by control of analysis apparatus 1. Analysis apparatus 1 may include at least one device among input device 200 and display device 250. Analysis system 120 may include a touch panel including input device 200 and display device 250 integrated with each other. Alternatively, analysis apparatus 1 may include this touch panel. Host device 270 is an upstream device of analysis apparatus 1. The information from host device 270 is provided to analysis apparatus 1. Host device 270 performs the error notification upon receipt of the error notification from analysis apparatus 1.

[Suction of Sample]

Next, a flow of suction of a sample in accommodation container 2 including cover member 22 using piercer 7 and nozzle 8 will be described and with reference to FIGS. 4 to 8. Note that a part of the rack in which accommodation container 2 is installed is shown as an installation portion.

Figure 4:
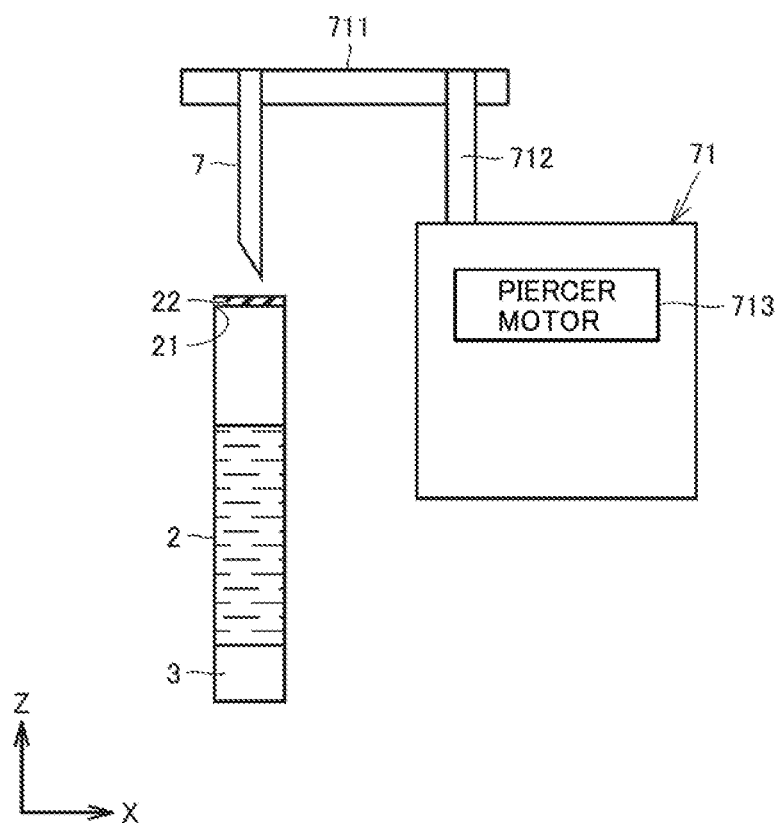
FIG. 4 shows a state before a piercer of the present embodiment pierces a cover member.

FIG. 4 shows a state before piercer 7 pierces cover member 22. When piercer 7 is inserted into accommodation container 2, piercer driving device 71 rotates piercer arm 711 to move piercer 7 horizontally to above accommodation container 2, as shown in FIG. 4.

Figure 5:
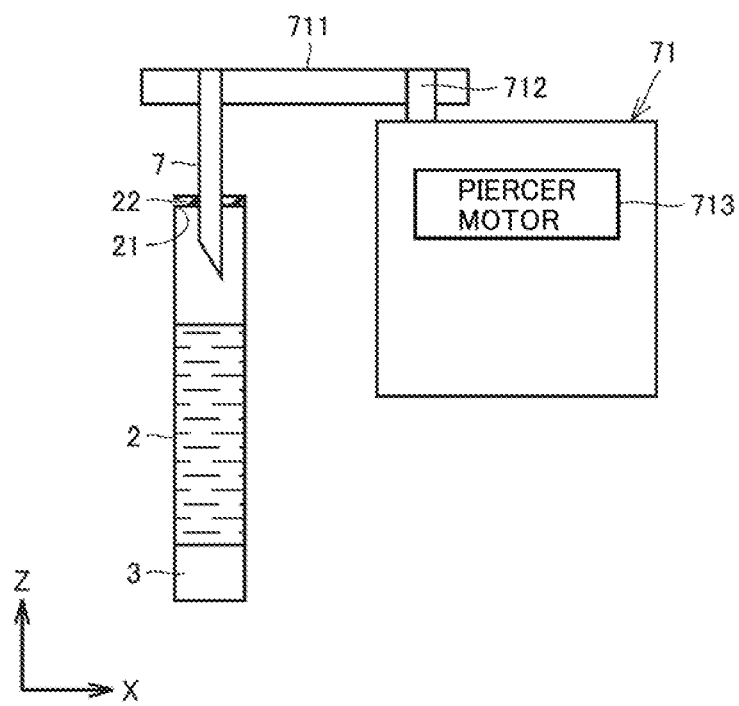
FIG. 5 shows a state after the piercer of the present embodiment has pierced the cover member.

FIG. 5 shows a state after piercer 7 has pierced cover member 22. Piercer driving device 71 moves rotary shaft 712 and piercer arm 711 vertically downward to move piercer 7 vertically downward. Consequently, piercer 7 pierces cover member 22, and then, piercer 7 enters accommodation container 2.

Figure 6:
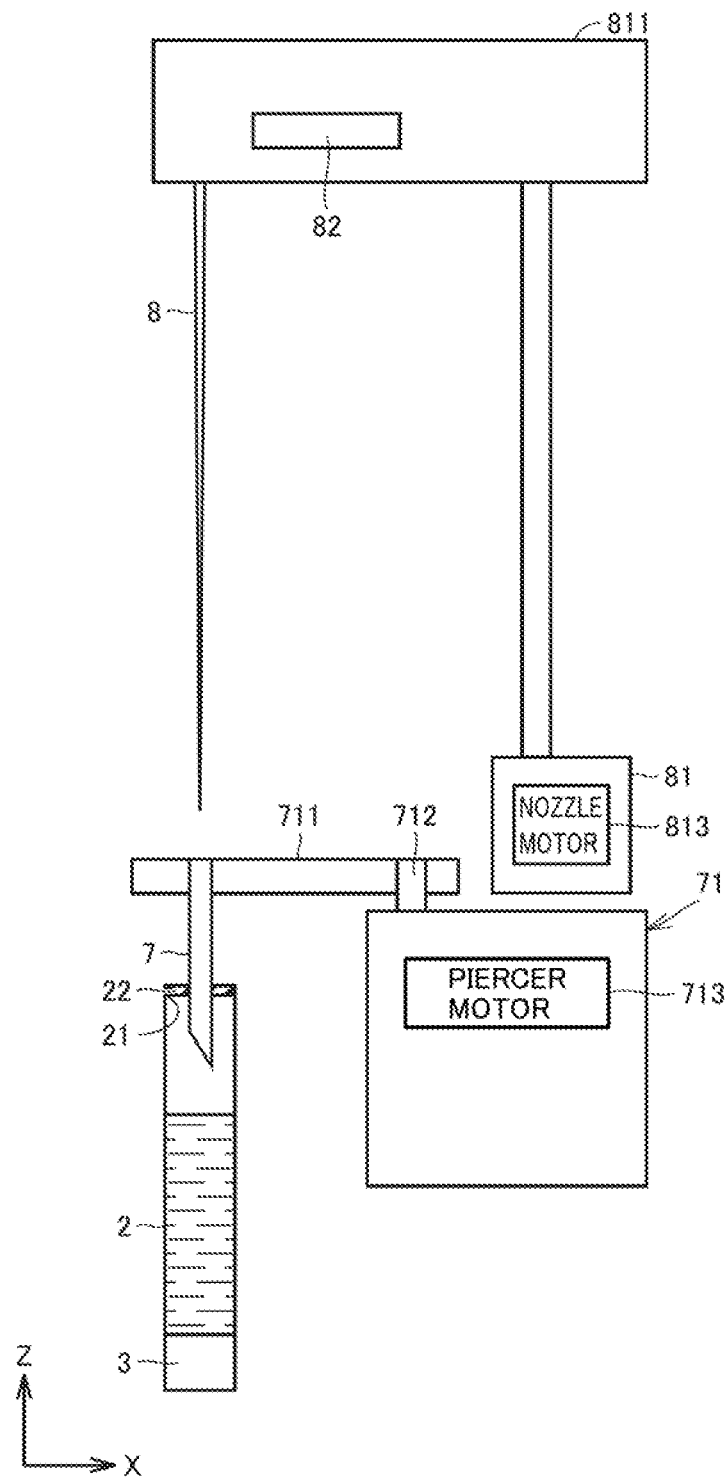
FIG. 6 shows a state before a nozzle is inserted into an accommodation container after the piercer of the present embodiment has pierced the cover member.

FIG. 6 shows a state before nozzle 8 is inserted into accommodation container 2 after piercer 7 has pierced cover member 22. When nozzle 8 is inserted into accommodation container 2, nozzle driving device 81 rotates nozzle arm 811 to move nozzle 8 horizontally to above piercer 7 inserted into accommodation container 2. Subsequently, nozzle driving device 81 moves nozzle 8 vertically downward so as to insert nozzle 8 into piercer 7, as shown in FIG. 6.

Herein, liquid surface sensor 82 is provided inside nozzle arm 811, as shown in FIG. 6. Liquid surface sensor 82 is typically a capacitance sensor. Liquid surface sensor 82 detects a change in capacitance when the tip of nozzle 8 or the side surface of nozzle 8 contacts the sample. Liquid surface sensor 82 detects contact of nozzle 8 with the sample based on the change in capacitance.

FIG. 7 shows a state in which nozzle 8 is in contact with a liquid surface 17A of a sample 17. When nozzle 8 has moved downward as shown in FIG. 7 and the tip of nozzle 8 has contacted liquid surface 17A of the sample as shown in FIG. 7, liquid surface sensor 82 detects that the tip of nozzle 8 has contacted liquid surface 17A, based on a change in capacitance. Controller 500 determines that the tip of nozzle 8 has contacted liquid surface 17A, based on the result of the detection of liquid surface sensor 82. In this manner, liquid surface sensor 82 is a sensor that detects that nozzle 8 has contacted the sample. The liquid surface sensor corresponds to "a first sensor" of the present disclosure.

When determining that the tip of nozzle 8 has contacted liquid surface 17A, controller 500 moves nozzle 8 downward further by a prescribed amount determined in advance. As nozzle 8 is moved downward by the prescribed amount, nozzle 8 is inserted into sample 17.

FIG. 8 shows a state in which nozzle 8 is inserted into sample 17. Controller 500 drives a pump (not shown) with nozzle 8 immersed in the sample of accommodation container 2, thereby suctioning the sample in accommodation container 2. As described above, controller 500 dispenses the suctioned sample into dispensing aperture 814.

[Collision Sensor]

Next, collision sensor 809 will be described. As described with reference to FIGS. 4 and 5, controller 500 causes piercer 7 to pierce cover member 22. Although cover member 22 is commonly in the form of rubber, piercer 7 may fail to pierce cover member 22 if cover member 22 has high hardness (if cover member 22 is hard). As nozzle 8 is moved downward further with piercer 7 not piercing cover member 22, nozzle 8 may be damaged due to, for example, pressing of cover member 22 against nozzle 8. Analysis apparatus 1 of the present embodiment then detects that nozzle 8 has collided with a collision object. For example, when piercer 7 has not pierced cover member 22, the collision object is cover member 22. When piercer 7 has pierced cover member 22, and when nozzle 8 is moved downward, nozzle 8 is inserted into accommodation container 2. When nozzle 8 is inserted into accommodation container 2, nozzle 8 may collide with impurities that are the collision object in accommodation container 2. Also in this case, analysis apparatus 1 of the present embodiment detects that nozzle 8 has collided with the collision object.

Controller 500 performs a second error process based on the detection that nozzle 8 has collided with cover member 22.

The second error process includes at least one of a second alarming process and a second error storing process. The second alarming process includes a process of outputting a second alarm sound from a speaker 722 and a process of displaying an error image on display device 250. The second alarm sound is a sound indicating that nozzle 8 has collided with cover member 22. A second error image is an image indicating that nozzle 8 has collided with cover member 22. The second error image is, for example, an image "P mistake", which will be described below. The second error storing process is a process of storing an error history in a prescribed storage area. The prescribed storage area may be a storage area of analysis apparatus 1 or a storage area of the external device to analysis apparatus 1. Further, when the error storing process is performed, and when the user performs an operation of displaying the second error image on input device 200, the stored error history is displayed on display device 250. A collision sensor that detects a state of collision will be described below.

Figure 9A:
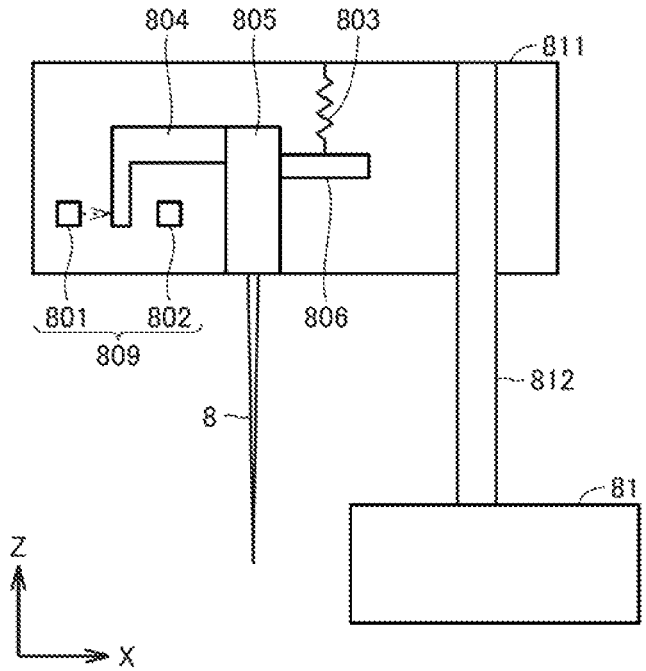
FIGS. 9A and 9B are views for illustrating a collision sensor of the present embodiment.
Figure 9B:
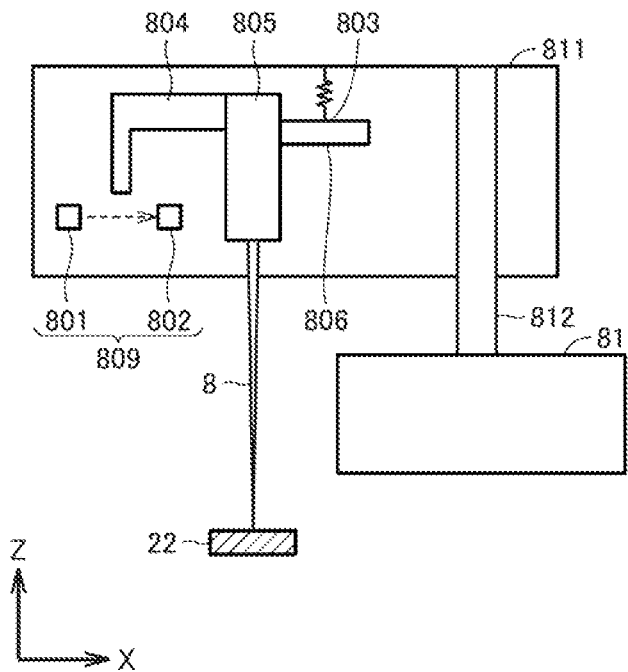

FIGS. 9A and 9B are views for illustrating the collision sensor. FIGS. 9A and 9B each show the inside of nozzle arm 811. FIG. 9A shows a situation where nozzle 8 is not in the state of collision. FIG. 9B shows a situation where nozzle 8 is in the state of collision.

A biasing member 803, a light shielding plate 804, a base 805, a holding member 806, and collision sensor 809 are arranged in nozzle arm 811. Base 805 is a member holding nozzle 8. Base 805 is joined to nozzle 8. Collision sensor 809 corresponds to a "second sensor" of the present disclosure. Biasing member 803 is, for example, a spring, more particularly, a helical compression spring. Biasing member 803 has one end attached to the inner surface of nozzle arm 811. Biasing member 803 has the other end held on holding member 806. Holding member 806 holds biasing member 803 and is also joined to the periphery of base 805. Biasing member 803 thus biases nozzle 8 downward in the Z-axis direction.

Light shielding plate 804 has an L shape in sectional view. Light shielding plate 804 has one end joined to the periphery of base 805. Collision sensor 809 includes a light output portion 801 and a light input portion 802. Light output portion 801 outputs light to light input portion 802. In a situation where light enters light input portion 802, an optical signal is transmitted to controller 500. The optical signal is a signal indicating that light enters light input portion 802.

Nozzle driving device 81 moves rotary shaft 812 downward to move nozzle 8 downward. As shown in FIG. 9A, when nozzle 8 is not in the state of collision, the light from light output portion 801 is shielded by light shielding plate 804. When nozzle 8 is not in the state of collision, thus, the light from light output portion 801 does not enter light input portion 802. As described above, a force of biasing member 803 is applied downward to nozzle 8. In a situation where nozzle 8 is not in the state of collision (e.g., in a situation where nozzle 8 begins colliding with a collision object), accordingly, the state in which no light enters light input portion 802 (i.e., the state shown in FIG. 9A) is maintained by the force applied to nozzle 8.

However, when nozzle driving device 81 moves nozzle 8 downward further from the time at which nozzle 8 has begun contacting the collision object (e.g., cover member 22), nozzle 8 is held back by cover member 22, and accordingly, a force upward in the Z-axis direction is applied to nozzle 8. Then, as nozzle 8 continues moving downward, and accordingly, the force applied upward to nozzle 8 exceeds the force applied downward to nozzle 8 by biasing member 803, nozzle 8 moves upward relative to nozzle arm 811, as shown in FIG. 9B.

As nozzle 8 moves upward relative to nozzle arm 811, light shielding plate 804 joined to nozzle 8 also moves upward. As light shielding plate 804 moves upward, light from light output portion 801 is no longer shielded by light shielding plate 804, as shown in FIG. 9B. Consequently, light enters light input portion 802. When light enters light input portion 802, controller 500 receives an input of an optical signal from light input portion 802. Controller 500 determines that nozzle 8 is in the state of collision upon input of an optical signal.

In this manner, the following configuration is provided in the example of FIGS. 9A and 9B. In this configuration, as nozzle 8 moves upward relative to nozzle arm 811, the state in which no light enters light input portion 802 changes to a state in which light enters light input portion 802. In a configuration of a modification, as nozzle 8 moves upward relative to nozzle arm 811, the state in which light enters light input portion 802 may change to the state in which no light enters light input portion 802.

In other words, analysis apparatus 1 includes light output portion 801 that outputs light, light input portion 802 that receives light, and biasing member 803. Biasing member 803 applies a force downward (i.e., toward accommodation container 2) to nozzle 8. Then, when nozzle 8 moves upward relative to nozzle arm 811 and the light entrance state of light input portion 802 changes, controller 500 determines that nozzle 8 is in the state of collision. A change in the light entrance state of light input portion 802 may be "a change from the state in which no light enters light input portion 802 to the state in which light enters light input portion 802", as in the present embodiment. A change in the light entrance state of light input portion 802 may be "a change from the state in which light enters light input portion 802 to the state in which no light enters light input portion 802", as in the modification.

As described above, examples of the case where the state of collision of nozzle 8 is detected mainly include "a case where nozzle 8 has collided with a collision object in piercer 7", "a case where nozzle 8 has collided with cover member 22 as a collision object when piercer 7 has failed to pierce cover member 22", and "a case where nozzle 8 has collided with a collision object in accommodation container 22 when piercer 7 has pierced cover member 22".

In the present embodiment, analysis apparatus 1 detects "that nozzle 8 has collided with cover member 22 as a collision object" by the following technique. FIG. 10 shows an example of the first information stored in a first storage device 5341. First storage device 5341 is included in storage device 534 (see FIG. 2). In FIG. 10, a first cover member and a second cover member are defined.

The first cover member is a material more extensible than the second cover member. A pulse corresponding to the first cover member is P1, and a pulse corresponding to the second cover member is P2, where P1>P2. If piercer 7 has failed to pierce cover member 22, generally, cover member 22 is more extensible when the cover member 22 is the first cover member than when cover member 22 is the second cover member. If piercer 7 has failed to pierce cover member 22, thus, a location in which nozzle 8 collides with cover member 22 is lower in the Z-axis direction when cover member 22 is the first cover member than when cover member 22 is the second cover member. Considering the above, setting is made such that P1>P2 as shown in FIG. 10.

Controller 500 obtains a type of cover member 22. Controller 500 determines, for example, whether cover member 22 is the first cover member or the second cover member. Controller 500 determines that nozzle 8 has collided with cover member 22 when an amount of driving (i.e., pulse number) of nozzle 8 at the detection of the collision of nozzle 8 by collision sensor 809 is an amount of driving (i.e., pulse P1 or pulse P2 shown in FIG. 10) associated with the obtained type of cover member 22.

For example, when determining that cover member 22 is the first cover member, controller 500 determines that nozzle 8 has collided with cover member 22 when the amount of driving (i.e., pulse number) of nozzle 8 at the detection of the collision of nozzle 8 is P1 (or is a value close to P1). When determining that cover member 22 is the second cover member, controller 500 determines that nozzle 8 has collided with cover member 22 if the amount of driving (i.e., pulse number) of nozzle 8 at the detection of the collision of nozzle 8 is P2 (or is a value close to P2).

In FIG. 10, pulse numbers of two types of cover members 22 are defined. However, pulse numbers of three or more types of cover members 22 may be defined. Specifically, in the information in FIG. 10, a pulse (i.e., prescribed amount of driving) is associated with each of two or more types of cover members 22.

As described above, each rack 3 is provided with a mark for determining whether rack 3 is the CTS rack or SAM rack. The mark for determining as the CTS rack may include information by which controller 500 can determine the type of cover member 22 of accommodation container 2 held by this CTS rack. In this case, controller 500 obtains a type of cover member 22 of accommodation container 2 based on the result of the detection of mark sensor 700. Controller 500 then obtains a pulse number associated with the type of cover member 22 with reference to the information indicating the settings of FIG. 10.

Controller 500 performs a repiercing process of piercer 7 when controller 500 determines that nozzle 8 has collided with cover member 22, that is, when controller 500 performs the second error process. The repiercing process of piercer 7 is a process of causing piercer 7 to pierce cover member 22 again when piercer 7 has failed to pierce cover member 22. The repiercing process is a process of moving piercer 7 upward once and moving piercer 7 downward again for an attempt to cause piercer 7 to pierce cover member 22.

A restricted number of times is defined for the number of times of the repiercing process. If controller 500 performs the repiercing process many times, there is a possibility that a fragment of cover member 22 would be mixed in sample 17 as a result of the collision of piercer 7 with cover member 22. Also, when controller 500 performs the repiercing process many times, there is a possibility that piercer 7 would be damaged as a result of the collision of piercer 7 with cover member 22.

Thus, "a possibility that a fragment of cover member 22 would be mixed in sample 17" and "a possibility that nozzle 8 would be damaged" can be reduced by setting a restricted number of times for the number of times of the repiercing process. The restricted number of times corresponds to "a prescribed number of times" of the present disclosure. The restricted number of times is, for example, "twice".

Controller 500 performs the repiercing process until the number of times of the repiercing process reaches the prescribed number of times. When the number of times of the repiercing process reaches the prescribed number of times, controller 500 issues an alarm. Issuing an alarm is, for example, outputting an alarm sound from speaker 722.

[Detection of Liquid Surface within Piercer]

After piercer 7 has pierced cover member 22, controller 500 inserts nozzle 8 into piercer 7 and moves nozzle 8 downward, as shown in FIG. 6.

The case where accommodation container 2 is, for example, a blood collection tube will now be described. Blood is normally collected by a nurse or the like using a blood collection needle. The blood collected from a subject is accommodated in the blood collection tube which is kept covered with cover member 22. When the nurse removes the blood collection needle from the blood collection tube after collecting blood, a small amount of blood may adhere to the upper portion of cover member 22. In this case, when piercer 7 pierces cover member 22, the blood adhering to cover member 22 may enter piercer 7. When piercer 7 pierces cover member 22, sample 17 inside accommodation container 2 may flow backward due to a difference between a pressure value inside accommodation container 2 and a pressure value outside accommodation container 2. Also in this case, blood may adhere to the inside of piercer 7.

Figure 11:
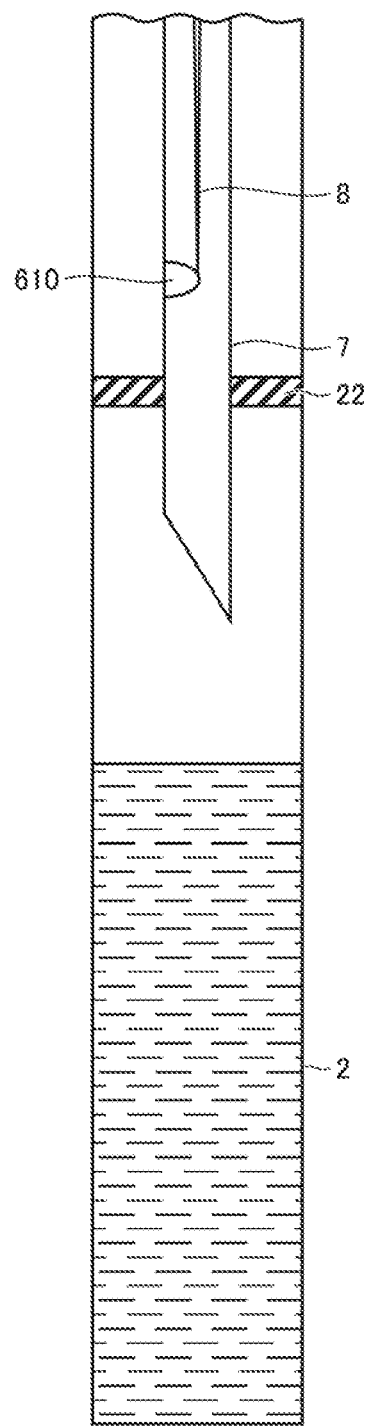
FIG. 11 shows a situation where blood (sample) adheres to the inside of the piercer of the present embodiment.

FIG. 11 shows a situation where blood (sample) adheres to the inside of piercer 7. The adhering sample in FIG. 11 is denoted by a droplet 610. Droplet 610 is a part of the sample. The example of FIG. 11 shows a situation where the tip of nozzle 8 is in contact with droplet 610. When the tip of nozzle 8 contacts droplet 610, liquid surface sensor 82 detects droplet 610. Controller 500 thus starts suctioning nozzle 8 based on the detection of droplet 610, and accordingly, performs idle suction of nozzle 8. Idle suction is suction in a location free from a specimen.

In the present embodiment, thus, controller 500 performs a first error process upon detection of contact of nozzle 8 with the sample (in the example of FIG. 11, droplet 610) inside piercer 7.

The first error process includes at least one of a first alarming process and a first error storing process. The first alarming process includes a process of outputting a first alarm sound from speaker 722 and a process of displaying a first error image on display device 250. The first error image is an image indicating that nozzle 8 has detected a sample inside piercer 7. The first error image is, for example, an image "P mistake", which will be described below. The first error storing process is a process of storing an error history in a prescribed storage area. The prescribed storage area may be a storage area of analysis apparatus 1 or a storage area of the external device to analysis apparatus 1. Further, when the error storing process is performed, and when the user performs an operation of displaying the first error image on input device 200, the stored error history is displayed on display device 250. When performing the first error process, controller 500 does not allow nozzle 8 to perform the suction process. When performing the first error process, controller 500 performs the resuction process without causing nozzle 8 to perform the suction process. The resuction process is a suction process of nozzle 8 performed after moving nozzle 8 upward once and moving nozzle 8 downward again.

Figure 12:
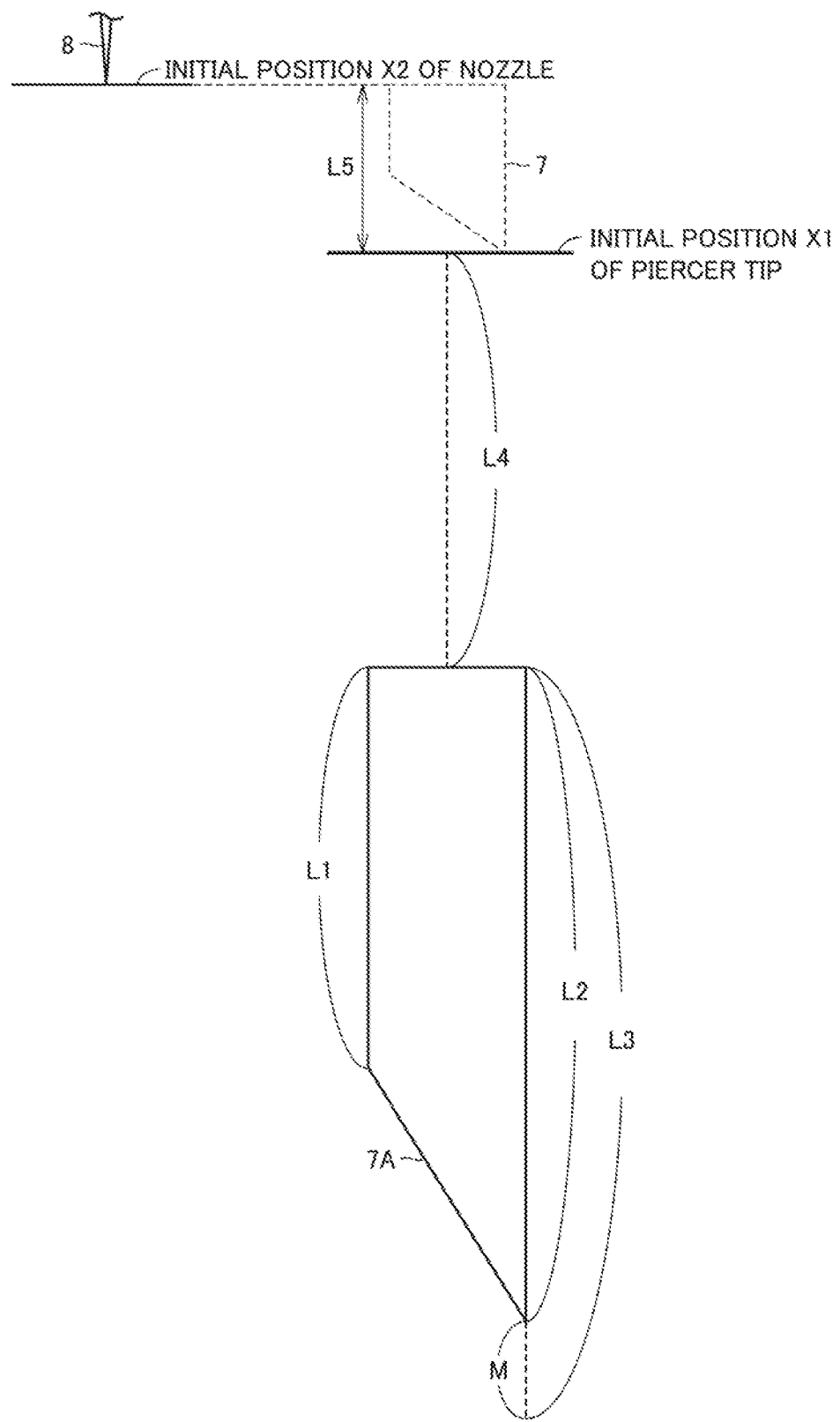
FIG. 12 shows a technique of detecting a sample by a nozzle inside the piercer of the present embodiment.

Next, a technique of causing, by controller 500, nozzle 8 to detect a sample inside piercer 7 will be described. FIG. 12 shows the technique of detecting a sample by nozzle 8 inside piercer 7. FIG. 12 shows an initial position X1 of the tip of piercer 7 and an initial position X2 of the tip of nozzle 8. Piercer 7 indicated by the broken line shows piercer 7 located at the initial position. Piercer 7 indicated by the solid line shows piercer 7 which has pierced cover member 22. Initial position X1 of the tip of piercer 7 is a position of the tip of piercer 7 before driving. Initial position X2 of the tip of nozzle 8 is a position of the tip of nozzle 8 before driving. As shown in FIG. 8 and the like, initial position X2 of the tip of nozzle 8 is set to be above initial position X1 of the tip of piercer 7.

In the example of FIG. 12, a tapered surface 7A is formed in piercer 7 to form the tip of piercer 7. Piercer 7 has a first length L1 and a second length L2 larger than first length L1 in the direction of extension of piercer 7. In order to cause piercer 7 to pierce cover member 22, a distance by which piercer 7 is driven is determined. This distance is a distance L2+L4. The distance between initial position X2 and initial position X1 is a distance L5.

As shown in FIGS. 11 and 12, a distance of driving LN of nozzle 8 at the contact of nozzle 8 with droplet 610 inside piercer 7 is such that L4+L5<LN<L4+L5+L2. A case where contact of nozzle 8 with the sample is detected when distance of driving LN of nozzle 8 is such that LN≤L4+L5+ L2 means that nozzle 8 has contacted the sample outside piercer 7.

In the present embodiment, thus, when distance of driving LN of nozzle 8 is smaller than L4+L5+L2, and when contact of nozzle 8 with the sample is detected, controller 500 determines that nozzle 8 has contacted droplet 610 inside piercer 7. In other words, when the amount of driving of nozzle 8 is smaller than an amount of driving corresponding to L4+L5+L2, and when contact of nozzle 8 with the sample is detected, controller 500 determines that nozzle 8 has contacted droplet 610 inside piercer 7. A threshold Th for an amount of driving is an "amount of driving corresponding to L4+L5+L2". In this case, when the amount of driving of nozzle 8 is smaller than threshold Th, and when contact of nozzle 8 with the sample is detected, controller 500 determines that nozzle 8 has contacted droplet 610 inside piercer 7.

Threshold Th is an amount of driving corresponding to distance L4, distance L5, and distance L2. Since distance L4 and distance L5 are values determined in advance, threshold Th can also be referred to as an amount of driving corresponding to length L2 of piercer 7 in the direction of extension. Specifically, when the amount of driving of nozzle 8 (i.e., the distance of driving of nozzle 8) is smaller than threshold Th, and when nozzle 8 contacts the sample, controller 500 determines that nozzle 8 has contacted the sample inside piercer 7. In other words, controller 500 determines that nozzle 8 has contacted the sample inside piercer 7, based on the amount of driving of nozzle 8 and the amount of driving corresponding to length L2 of piercer 7 in the direction of extension.

Figure 13:
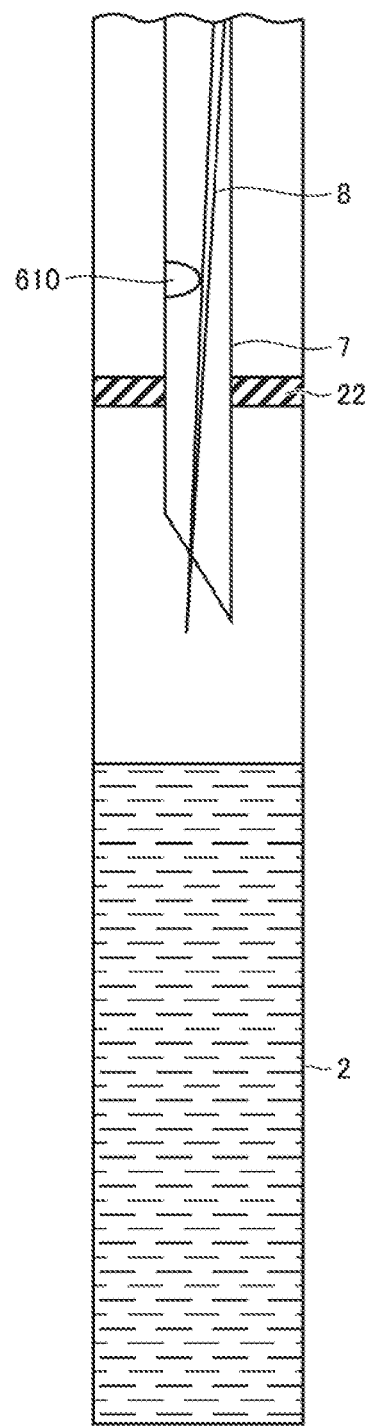
FIG. 13 shows a situation where a droplet is in contact with a side surface of the nozzle of the present embodiment.

Nozzle 8 may move obliquely downward inside piercer 7. In this case, controller 500 determines that droplet 610 has contacted the side surface of nozzle 8. FIG. 13 shows a situation where droplet 610 has contacted the side surface of nozzle 8. Even in the case shown in FIG. 13, controller 500 performs the first error process. In the example of FIG. 13, the tip of nozzle 8 projects a little from piercer 7. Even when the tip of nozzle 8 projects a little from piercer 7 and nozzle 8 has contacted droplet 610, controller 500 may determine that nozzle 8 has contacted droplet 610. For example, the length of the piercer in the direction of extension may be L3, where L3=L2+α. For example, a designer of analysis apparatus 1 may set the value of α. In a modification, the length of the piercer in the direction of extension may be L1.

The situation where nozzle 8 contacts droplet 610 inside piercer 7 is a situation that may occur in the first suction process in one accommodation container 2.

[Detection of Liquid Surface within Accommodation Container]

Also as described with reference to FIG. 8 and the like, after piercer 7 has pierced cover member 22, nozzle 8 is inserted into piercer 7 after piercing, and nozzle 8 suctions the sample of accommodation container 2. For example, in the case where the suction process is performed multiple times in one accommodation container 2, the sample inside accommodation container 2 has decreased after one suction process. In a normal case, thus, the height of the liquid surface at the execution of the suction process should be below the height of the liquid surface at the execution of the previous suction process.

Figure 14:
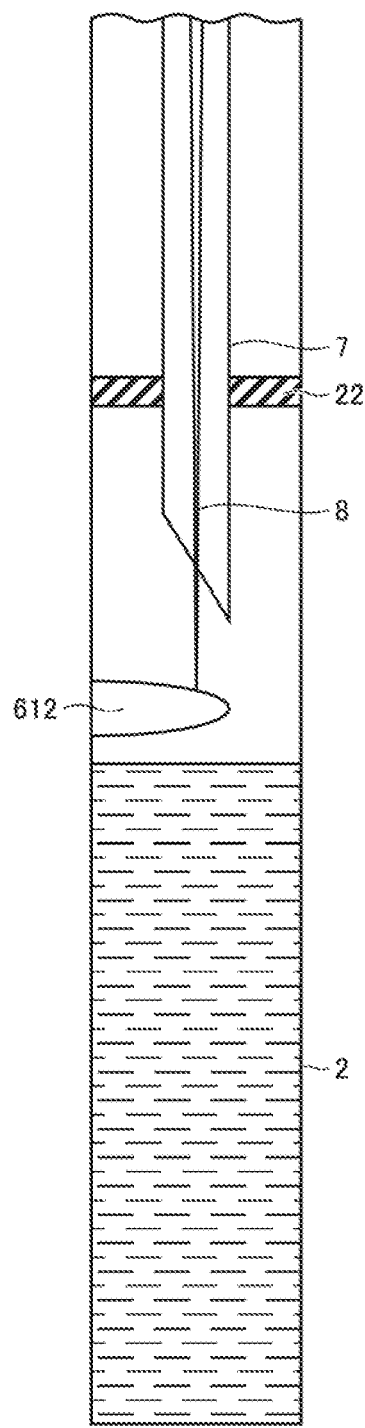
FIG. 14 shows an example situation where an air bubble is generated above the liquid surface of the sample of the present embodiment.

However, an air bubble or the like of the sample may occur above the liquid surface of the sample due to, for example, a vibration or the like of analysis apparatus 1. FIG. 14 shows an example situation where an air bubble 612 is generated above liquid surface 17A of sample 17. It is assumed here that nozzle 8 has contacted air bubble 612 as shown in FIG. 14. In this case, even though nozzle 8 has not reached the liquid surface of sample 17, controller 500 determines that nozzle 8 has contacted the liquid surface of sample 17, based on the result of the detection of liquid surface sensor 82. In this case, nozzle 8 may perform idle suction.

In the present embodiment, thus, controller 500 determines the height of nozzle 8 upon detection of contact of nozzle 8 with liquid surface 17A and then stores the determined height of nozzle 8 in storage device 534. The height of nozzle 8 is also referred to as the "previous height". The detection of contact of nozzle 8 with liquid surface 17A is also referred to as the "previous detection". The height of nozzle 8 corresponds to an amount of driving of nozzle 8 from the initial position. The amount of driving of nozzle 8 is a pulse number output to the nozzle motor, and accordingly, controller 500 determines this pulse number as the height of nozzle 8. After storing the previous height, controller 500 causes nozzle 8 to perform the suction process.

Subsequently, when the next suction is performed, controller 500 determines the height of nozzle 8 upon detection of contact of nozzle 8 with liquid surface 17A, and stores the determined height of nozzle 8 in storage device 534. The height of nozzle 8 is also referred to as the "most recent height". Detection of contact of nozzle 8 with liquid surface 17A is also referred to as the "most recent detection". The "most recent height" corresponds to a "first height" of the present disclosure. The "previous height" corresponds to the "second height" of the present disclosure.

FIGS. 15A, 15B, 15C, and 15D show examples of liquid surface 17A that nozzle 8 has contacted. FIG. 15A shows an example of liquid surface 17A for the previous height. FIG. 15B shows an example of liquid surface 17A for the most recent height when, for example, air bubble 612 or the like is not generated in nozzle 8. FIG. 15C shows an example of liquid surface 17A for the most recent height when air bubble 612 or the like is generated in nozzle 8. In the examples of FIGS. 15A, 15B, 15C, and 15D, the height of the position of nozzle 8 is a height with a bottom surface 2B of accommodation container 2 as a reference.

Controller 500 determines whether the most recent height (i.e., first height) is above the previous height (i.e., second height). As shown in FIGS. 15A and 15B, when determining that most recent height H1 is below previous height H2 as shown in FIGS. 15A and 15B (i.e., when determining that most recent height H1<previous height H2), controller 500 performs the nozzle suctioning process.

Contrastingly, when determining that most recent height H3 is above previous height H2 (i.e., most recent height H3>previous height H2) as shown in FIGS. 15A and 15C, controller 500 performs a third error process. The situation of FIG. 15C may occur even when a part of sample 17 adheres not air bubble 612 but a portion above liquid surface 17A. When the previous height is as shown in FIG. 15A and even when the most recent height is as shown in FIG. 13, controller 500 determines that most recent height H3 is above previous height H2. Also in this case, controller 500 thus performs the third error process.

The third error process includes at least one of a third alarming process and a third error storing process. The third alarming process includes a process of outputting a third alarm sound from speaker 722 and a process of displaying a third error image on display device 250. The third error image is an image indicating that nozzle 8 has detected the sample inside accommodation container 2. The third error image is an S up image, which will be described below. The third alarm sound is a sound indicating that nozzle 8 has detected the sample inside accommodation container 2. The third error storing process is a process of storing an error history in a prescribed storage area. The prescribed storage area may be a storage area of analysis apparatus 1 or may be a storage area of the external device to analysis apparatus 1. Further, when the error storing process is performed, and when the user performs an operation of displaying the third error image on input device 200, the stored error history is displayed on display device 250. When performing the third error process, controller 500 performs the resuction process without causing nozzle 8 to perform the suction process. The resuction process is a suction process of nozzle 8 after moving nozzle 8 upward once and moving nozzle 8 downward again. When the first error process to the third error process are performed, droplet 610 may be located in piercer 7 (see FIG. 13). Controller 500 may accordingly pull piercer 7 out of accommodation container 2 and then clean and dry piercer 7. Controller 500 then moves piercer 7 downward again.

In this manner, controller 500 performs the third error process based on the most recent height (i.e., first height) of nozzle 8 at the detection by liquid surface sensor 82 that nozzle 8 has contacted liquid surface 17A of sample 17 and the previous height (i.e., second height) of nozzle 8 stored in storage device 534 and obtained at the previous detection by liquid surface sensor 82. Typically, controller 500 determines whether the most recent height (i.e., first height) is above the previous height (i.e., second height). When determining that most recent height H3 is above previous height H2 (i.e., when determining that most recent height H3>previous height H2), controller 500 performs the third error process.

As shown in FIG. 15D, the portion outside liquid surface 17A may move more upward than the central portion of liquid surface 17A due to an effect, such as a surface tension of sample 17. In this case, nozzle 8 may move downward with the tip of nozzle 8 directed obliquely. In this case, the heights may be such that most recent height H4>previous height H2.

However, even when nozzle 8 suctions sample 17 in the state shown in FIG. 15D, nozzle 8 is less likely to perform idle suction. In the state shown in FIG. 15D, thus, controller 500 performs the suction process of nozzle 8. Specifically, in the case where a difference ΔH between the most recent height and the previous height is less than the threshold even when the most recent height is above the previous height, controller 500 performs the suction process of nozzle 8. The case where difference ΔH is less than the threshold of the difference refers to an extremely small difference ΔH as shown in FIG. 15D. The threshold is a value corresponding to a prescribed pulse amount of nozzle motor 813. The prescribed pulse amount is, for example, 10 pulses, approximately 1.5 mm.

In the present embodiment, when the most recent height is above the previous height, and when difference ΔH between the most recent height and the previous height is not less than the threshold, controller 500 performs the third error process. In a modification, when determining that the most recent height is above the previous height without using the threshold, controller 500 may perform the third error process. In this manner, controller 500 performs the third error process based on the most recent height being above the previous height.

Figure 16:
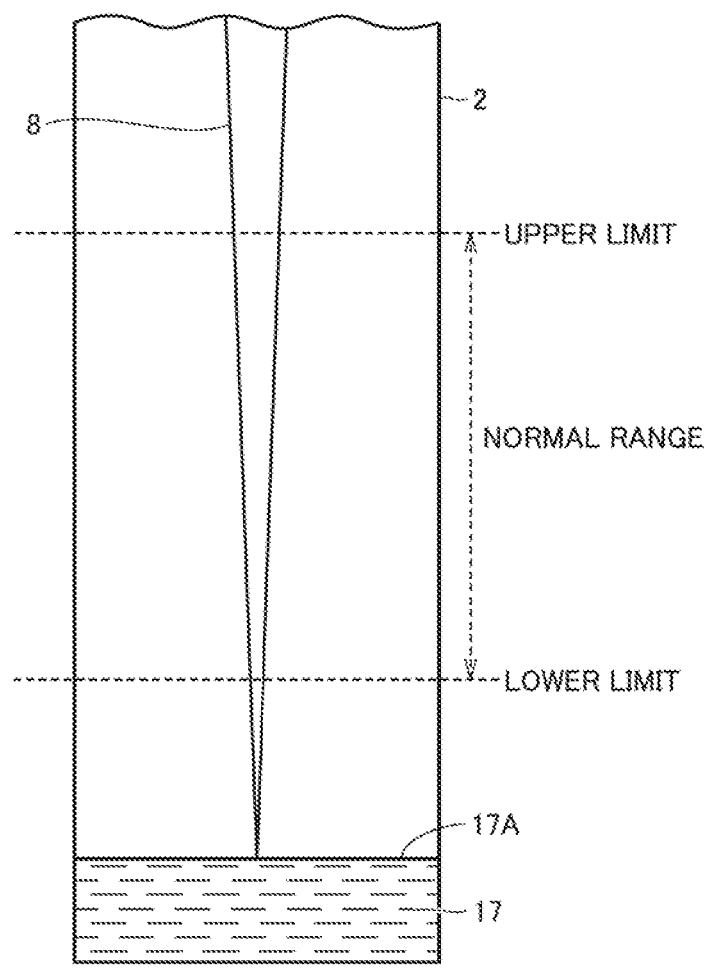

Controller 500 can also perform the error process on another condition. For example, FIG. 16 is a view for illustrating another example condition. In the present embodiment, an upper limit and a lower limit are set for liquid surface 17A of sample 17, as shown in FIG. 16. When the amount of driving at the detection of sample 17 by liquid surface sensor 82 is smaller than the amount of driving corresponding to the upper limit, that is, when liquid surface sensor 82 detects sample 17 at the height above the upper limit, controller 500 performs a fourth error process. The fourth error process is performed when, for example, an excessively large amount of sample 17 is accommodated in accommodation container 2.

The fourth error process includes at least one of a fourth alarming process and a fourth error storing process. The fourth alarming process includes a process of outputting a fourth alarm sound from speaker 722 and a process of displaying a fourth error image on display device 250. The fourth error image is an image indicating that the position of detection of liquid surface sensor 82 is the position above the upper limit. The fourth error image corresponds to an S mistake, which will be described below. The fourth alarm sound is a sound indicating that the position of detection of liquid surface sensor 82 is above the upper limit. The fourth error storing process is a process of storing an error history of a fourth error in a prescribed storage area. The prescribed storage area may be a storage area of analysis apparatus 1 or a storage area of the external device to analysis apparatus 1. Further, when the error storing process is performed, and when the user performs the operation of displaying the fourth error image on input device 200, the fourth error image is displayed on display device 250.

When the amount of driving at the detection of sample 17 by liquid surface sensor 82 is larger than the amount of driving corresponding to the lower limit, that is, when liquid surface sensor 82 detects sample 17 at a position below the lower limit, controller 500 performs a fifth error process. The fifth error process is performed when, for example, accommodation container 2 accommodates an excessively small amount of sample 17.

The fifth error process includes at least one of a fifth alarming process and a fifth storing process. The fifth alarming process includes a process of outputting a fifth alarm sound from speaker 722 and a process of displaying a fifth image on display device 250. The fifth image is an image indicating that the position of detection of liquid surface sensor 82 is below the lower limit. The fifth error image corresponds to an S shortage, which will be described below. The fifth alarm sound is a sound indicating that the position of detection of liquid surface sensor 82 is below the lower limit. The fifth storing process is a process of storing an error history of a fifth error in a prescribed storage area. The prescribed storage area may be a storage area of analysis apparatus 1 or may be a storage area of the external device to analysis apparatus 1. Further, when the error storing process is performed, and when the user performs an operation of displaying the fifth image on input device 200, the fifth image is displayed on display device 250. The range between the upper limit and the lower limit is referred to as a "normal range" as shown in FIG. 16.

[As to Error Display]

Next, an example error display by display device 250 will be described. FIG. 17 shows an example screen of a list of requests made to analysis apparatus 1. As shown in the screen of FIG. 17, a request made to analysis apparatus 1 is input through input device 200. In the example of FIG. 17, a request identification column 950, a specimen column 951, a rack column 952, a status column 954, an analysis category column 956, a request list button 906, a data list button 908, and an error button 910 are mainly displayed. The screen of FIG. 17 is displayed when request list button 906 is operated.

Identification information for identifying each request is displayed in request identification column 950. Request numbers are displayed as identification information in request identification column 950. Information for identifying each specimen to be analyzed is displayed in specimen column 951. In the example of FIG. 17, for example, S1 to S8 are displayed as specimen identification information. A specimen bar code may be displayed as specimen identification information. A type of a rack and a date and time of a request are displayed in rack column 952. The type of the rack is information indicating a location in which a specimen is stored. For example, for a request with a request number "2", the following is displayed: the rack is "S001-02", and the date and time of the request is "14:26, April 19". Also, "S" and "P" of the initials of the types of racks indicate the SAM rack and CTS rack, respectively.

Also, a category of an analysis (hereinafter, referred to as "analysis category") performed per request No. is brought into correspondence with request No. In the example of FIG. 17, an analysis category A to an analysis category D are provided as analysis categories. In each analysis category, a reagent to be used, an amount of a specimen to be used, and an analysis technique are defined. Analyses are performed in order of an analysis in accordance with analysis category A, an analysis in accordance with analysis category B, an analysis in accordance with analysis category C, and an analysis in accordance with analysis category D. One or more analysis categories requested to one specimen are also referred to "a plurality of analysis categories". In this manner, in the present embodiment, an analysis mechanism 723 can perform analyses in accordance with a plurality of analysis categories (analysis category A to analysis category D) on one specimen under the control of controller 500. Display device 250 also displays specimens (i.e., specimen identification information S1 to specimen identification information S8).

In the status column, an error message is displayed. Herein, information "S UP X" and information "P MISTAKE X" are displayed as error messages in the example of FIG. 17. The information "S UP X" corresponds to a third error message (see FIG. 19 described below) indicating an error based on the third error process or a third error image. The information "P MISTAKE X" shows a first error message (see FIG. 19 described below) indicating an error based on the first error process and a second error message (see FIG. 19 described below) indicating an error based on the second error process. The information "P MISTAKE X" may correspond to the first error image or the second error image described above.

Also, a fourth error message "S mistake" (see FIG. 19 described below) and a fifth error message "S shortage" (see FIG. 19 described below) are displayed, which are not shown. "S mistake" is the fourth error image or an error message indicating an error based on the fourth error process. "S shortage" is a sixth error image or an error message indicating an error based on fifth error process. Alternatively, other error messages may be displayed. The other error messages include an error message indicating that dispensing of a reagent has failed and an error message indicating that there is not enough reagent.

FIG. 18 shows a list of analysis results. When data list button 908 of FIG. 17 is operated, controller 500 displays the screen of the list of analysis results of FIG. 18. In the example of FIG. 18, request identification column 950, specimen column 951, rack column 952, and an analysis result column 959 are displayed. A time described in request identification column 950 in the example of FIG. 18 is a time at which the process by analysis apparatus 1 has completed. In the example of FIG. 18, four analysis results, namely, an analysis result 961 to an analysis result 964, are displayed.

In analysis result 961, an analysis result of specimen S7 is shown, and an analysis result A10 is derived for analysis category A. However, an error of S up is detected for the next analysis category B. Herein, the error of "S up" is an error at the detection of droplet 610 by liquid surface sensor 82 in the case of FIG. 15C. This error is an error detected when nozzle 8 contacts droplet 610, and in many cases, droplet 610 falls and disappears as nozzle 8 contacts droplet 610. In the present embodiment, upon detection of an error of S up, nozzle 8 is moved upward and moved downward again, thereby causing nozzle 8 to perform resuction. At the time of resuction by nozzle 8, droplet 610 has disappeared in many cases.

In the present embodiment, thus, upon detection of an error of S up, analysis mechanism 723 performs analyses of categories other than a category for which the error of S up has been detected among a plurality of categories including the category for which the error of S up has been detected. In other words, when an error of S up is detected, analysis mechanism 723 analyzes a specimen in accordance with the analysis categories other than the analysis category for which the error of S up has been detected among the plurality of analysis categories.

In analysis result 961 of the example of FIG. 18, a case where an error of S up has been detected is shown in analysis category B. Thus, as to a plurality of analysis categories including analysis category B, analyses are performed in accordance with the categories (i.e., analysis category C and analysis category D) after the category (i.e., analysis category B) for which the error of S up has been detected. In the example of FIG. 18, the error of S up has been detected for analysis category C and analysis category D as well.

Then, analysis mechanism 723 again analyzes the specimen, in which the error of S up has been detected. In the example of FIG. 18, analysis mechanism 723 has again analyzed specimen B, in which the error of S up has been detected. In analysis result 963, an analysis result is displayed together with a character "REEXAMINED" indicating that an analysis has been performed again. In the example of FIG. 18, an analysis result A12 is displayed for the analysis result of the analysis in accordance with analysis category A. An analysis result B12 is displayed for the analysis result of the analysis in accordance with analysis category B. An analysis result C12 is displayed for the analysis result of the analysis in accordance with analysis category C. An analysis result D12 is displayed for the analysis result of the analysis in accordance with analysis category D. Each of analysis result A12, analysis result B12, analysis result C12, and analysis result D12 is displayed in association with a character image "REEXAMINED".

When S up is detected, error information 972 about S up is displayed, in association with a specimen (in the example of FIG. 18, specimen S7), in which S up has been detected. Also, when S up is detected, error information 976 about S up is displayed in association with an analysis category for which an error of S up has been detected among a plurality of analysis categories. In the example of FIG. 18, for analysis result 961, error information 972 about S up is displayed in association with specimen S7. Also, for analysis result 961, error information 976 about S up is displayed in association with analysis categories (i.e., analysis category B to analysis category D) for which the error of S up has been detected among the plurality of analysis categories.

When an error of P mistake is detected, analysis mechanism 723 does not analyze a specimen in accordance with analysis categories other than the analysis category for which the error of P up has been detected among a plurality of analysis categories. When the error of P mistake is detected, analysis mechanism 723 again analyzes specimen B, in which the error of P mistake has been detected. In the example of FIG. 18, since a P mistake has been detected through the examination in accordance with analysis category B, analyzes have not been performed in accordance with analysis category C and analysis category D, as shown in analysis result 962. In the example of FIG. 18, a character "UNEXAMINED" is displayed in analysis category C and analysis category D. In the example of FIG. 18, analysis mechanism 723 has again analyzed specimen B for which the error of P up has been detected, as shown in analysis result 964. In analysis result 964, an analysis result is displayed together with a character "REEXAMINED" indicating that an analysis has been performed again. In the example of FIG. 18, an analysis result A13 is displayed for the analysis result of the analysis in accordance with analysis category A. For the analysis result of the analysis in accordance with analysis category B, a P mistake has been detected again.

When a P mistake is detected, error information 974 about a P mistake is displayed in association with a specimen (in the example of FIG. 18, specimen S8), in which the P mistake has been detected. When a P mistake is detected, error information 978 about the P mistake is displayed in association with an analysis category for which an error of P mistake has been detected among a plurality of analysis categories. In the example of FIG. 18, for analysis result 962, error information 974 about the P mistake is displayed in association with specimen S8. For analysis result 962, error information 978 about a P mistake is displayed in association with an analysis category (i.e., analysis category B) for which the error of P mistake has been detected among the plurality of analysis categories.

Here, when an error of S up is detected, analysis apparatus 1 alerts the user to select any of analysis result A10 through an analysis in accordance with analysis categories other than an analysis category for which the error of S up has been detected (analysis of analysis result 961 of FIG. 18) and analysis result A12 through reanalysis performed on a specimen, in which the error of S up has been detected (an analysis of analysis result 963 of FIG. 18). In the present embodiment, thus, controller 500 displays error information 972 about S up in a manner different from that of another error information (error information about P mistake, error information about S shortage, error information about S mistake). In the example of FIG. 18, displaying in a different manner is indicated by differing the direction of oblique lines of hatching for error information 972 about S up and the direction of oblique lines of hatching for error information 974 about P mistake. Error information 972 about S up is displayed in a first color (e.g., orange), and error information 974 about P mistake is displayed in a second color (e.g., pink).

It is assumed here that droplet 610 has been located in piercer 7 at the execution of first suction (e.g., suction for an analysis in accordance with analysis category A of analysis result 961 of FIG. 18), and nozzle 8 has performed idle suction in the situation of FIG. 13. It is further assumed that nozzle 8 has detected a liquid surface in the situation of FIG. 11 through the execution of the second suction. In this case, controller 500 may display a P mistake (first error image) for reexamination without performing analyses in accordance with the other analysis categories of analysis result 961. This is because when the derivation of analysis result A10 of analysis result 961 is detected through the detection of a specimen at a position of FIG. 13, suction of a specimen would not have been performed properly, and accordingly, the P mistake is displayed to prevent the user from using analysis result A10.

In the example of FIG. 18, an example in which the manner of displaying error information which is associated with the specimen is different between S up and P mistake has been described. However, controller 500 may display at least one piece of error information among error information associated with a specimen and error information associated with the analysis category for which the error has been detected, in a manner different from that of error information indicating that another error has been detected.

For an error (e.g., S mistake or S shortage) different from both of S up and P mistake, for example, a mark "X" is not displayed, opposed to the cases of S up and P mistake.

When error button 910 of FIG. 18 is operated, for example, a specific content of P mistake (i.e., the content that an error is based on the first error process or the second error process) is displayed.

FIG. 19 shows an example outline of each error message. A first error message is a message indicating that "a nozzle has detected a sample inside a piercer". The first error message is, for example, a message indicating the case of FIG. 11. The first error message corresponds to the P mistake described above. A second error message is a message indicating that "a nozzle has collided with a cover member". The second error message is, for example, a message indicating the case of FIG. 9B. The second error message corresponds to the P mistake described above. A third error message is a message indicating that "a liquid surface has been detected above the previous height". The third error message is, for example, a message indicating the case of FIG. 15C. The third error message corresponds to the S up described above.

A fourth error message is a message indicating that "a liquid surface has been detected at a position above an upper limit". The fourth error message is, for example, a message when liquid surface sensor 82 has detected a liquid surface at a position above the upper limit shown in FIG. 16. The fourth error message corresponds to the S mistake described above. A fifth error message is a message indicating that "a liquid surface has been detected at a position below a lower limit". The fifth error message is, for example, a message when liquid surface sensor 82 has detected a liquid surface at a position below the lower limit shown in FIG. 16. The fifth error message corresponds to the S shortage described above. In this manner, the first error message to the fifth error message are different messages. An error indicated by the first error message is referred to as a first error. An error indicated by the second error message is referred to as a second error. An error indicated by the third error message is referred to as a third error. An error indicated by the fourth error message is referred to as a fourth error. An error indicated by the fifth error message is referred to as a fifth error. Display device 250 may display an error message in correspondence with identification information about a specimen, in which an error based on the error message has occurred.

[As to Setting of Threshold]

Figure 20:
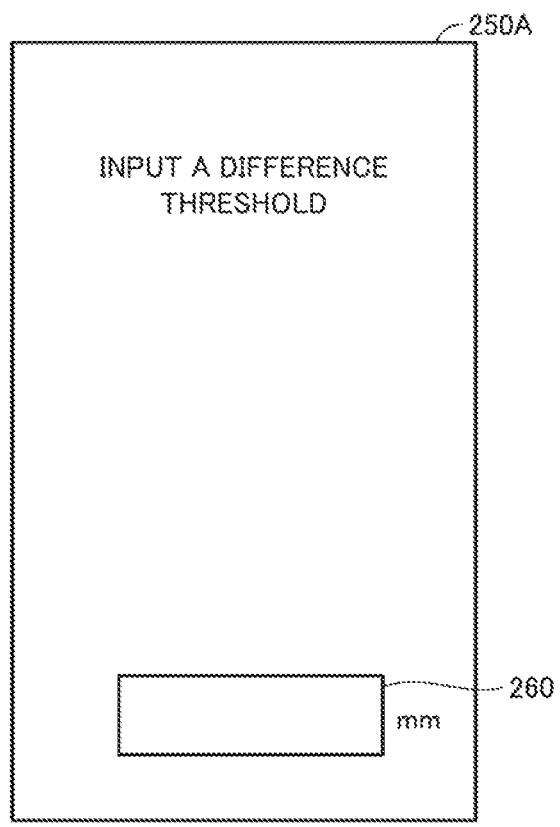
FIG. 20 shows an example setting screen for a difference threshold.

Next, an example screen displayed on display device 250 by controller 500 will be described. The user can freely set a threshold of a difference described above. FIG. 20 shows an example setting screen for a difference threshold. Controller 500 displays the setting screen in a display area 250A of display device 250. In the setting screen of FIG. 20, a character image "INPUT A DIFFERENCE THRESHOLD" and an input area 260 to which the difference threshold is input are displayed. The user inputs the difference threshold to input area 260 with input device 200. The threshold may be an allowable distance between the previous height and the most recent height or a pulse number of nozzle motor 813 which corresponds to the distance. In the example of FIG. 20, the threshold is a distance (e.g., in millimeters). When the difference threshold is input, controller 500 sets this difference threshold. For example, controller 500 stores the difference threshold in storage device 534. Controller 500 performs the third error process based on the difference threshold stored in storage device 534.

Figure 21:
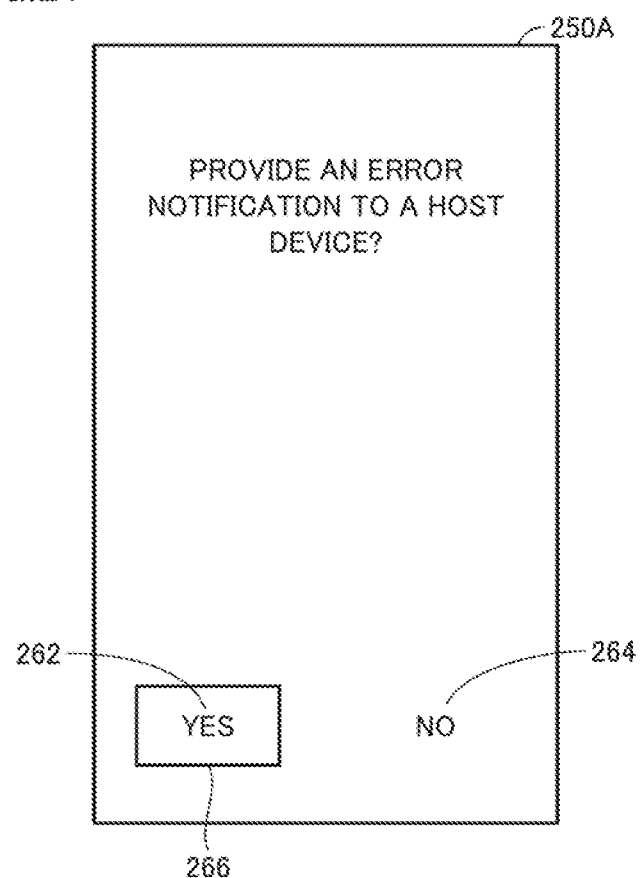
FIG. 21 shows an example setting screen for the presence or absence of an error notification.

In the present embodiment, the user can set whether to issue an error notification to host device 270 (see FIG. 3) from analysis apparatus 1. FIG. 21 shows an example setting screen indicating the presence or absence of an error notification. Controller 500 displays the setting screen in display area 250A of display device 250. On the setting screen of FIG. 21, a character image "PROVIDE AN ERROR NOTIFICATION TO A HOST DEVICE?", a YES image 262, a NO image 264, and a cursor 266 are displayed. The user points cursor 266 to any of YES image 262 and NO image 264 using input device 200. The user then performs a decision operation on input device 200, so that controller 500 performs a process corresponding to the image pointed by cursor 266. For example, when the user performs the decision operation with cursor 266 pointed to YES image 262, controller 500 provides an error notification to host device 270. Contrastingly, when the user performs the decision operation with cursor 266 pointed to NO image 264, controller 500 does not provide an error notification to host device 270. The error notification may be set by the user for each of the first error process to the fifth error process.

[Functional Configuration Example of Controller]

Figure 22:
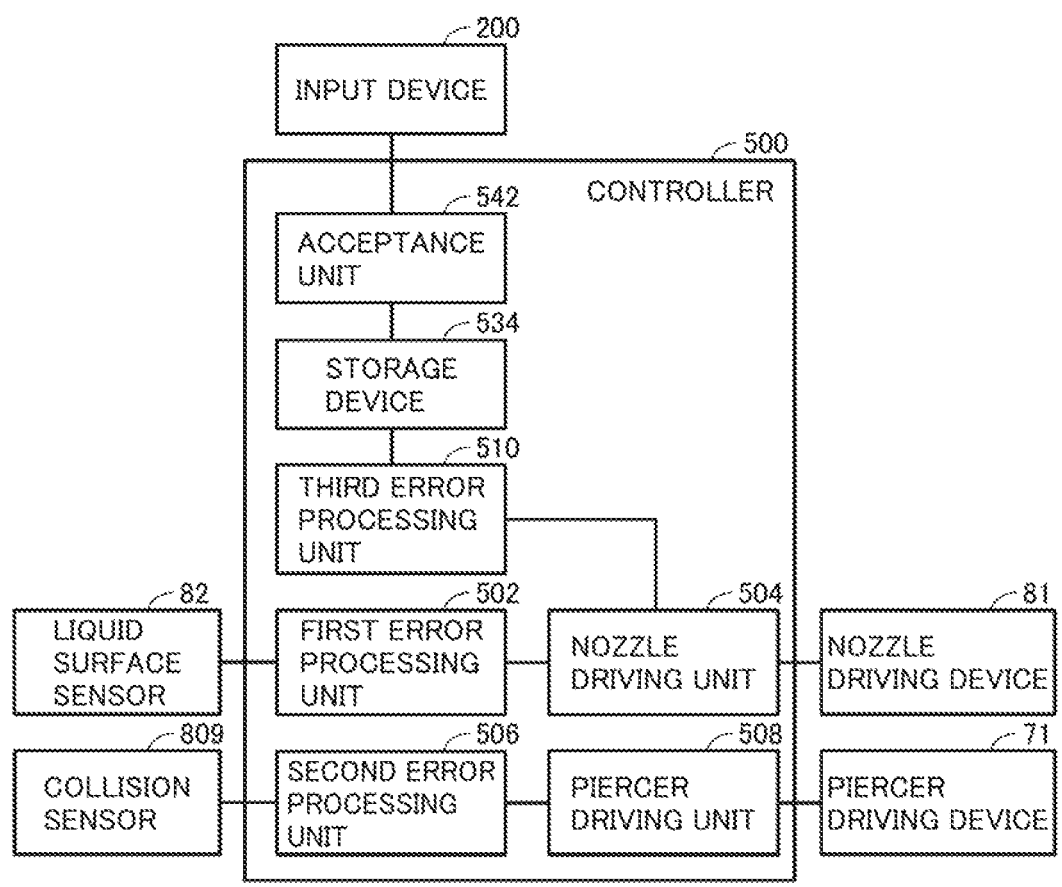
FIG. 22 is a block diagram of a functional configuration example of a controller.

FIG. 22 is a block diagram of a functional configuration example of controller 500. Controller 500 has functions of a first error processing unit 502, a nozzle driving unit 504, a second error processing unit 506, a piercer driving unit 508, a third error processing unit 510, and an acceptance unit 542.

When the amount of driving of nozzle 8 is smaller than threshold Th (e.g., an "amount of driving corresponding to L4+L5+L2"), and when contact of nozzle 8 with the sample is detected by liquid surface sensor 82, first error processing unit 502 determines that nozzle 8 has contacted droplet 610 inside piercer 7. When determining that nozzle 8 has contacted droplet 610 inside piercer 7, first error processing unit 502 performs the first error process. Nozzle driving unit 504 also causes nozzle driving device 81 to perform the resuction process of nozzle 8.

Second error processing unit 506 performs the second error process based on the detection of a collision by collision sensor 809. Also, piercer driving unit 508 causes piercer driving device 71 to perform the repiercing process of piercer 7.

When the most recent height is above the previous height and a difference between the most recent height and previous height is not smaller than the threshold, third error processing unit 510 performs the third error process. Also, nozzle driving unit 504 causes nozzle driving device 81 to perform the resuction process of nozzle 8. Display device 250 displays a setting screen (see FIG. 20) of the difference threshold. Acceptance unit 542 accepts the difference threshold input through the setting screen. The difference threshold accepted by acceptance unit 542 is stored in storage device 534. Third error processing unit 510 determines whether the third error has occurred using the difference threshold stored in storage device 534.

[Flowchart of Analysis Apparatus]

FIGS. 23 to 27 are flowcharts showing an example procedure of processes performed by analysis apparatus 1. Controller 500 performs the processes of FIGS. 23 to 27 when a "condition on which the suction process is performed once on the sample accommodated in accommodation container 2" is satisfied. The "condition on which the suction process is performed once" for the first suction process on one accommodation container 2 is, for example, a "condition on which the user has performed the start operation". Also, the "condition on which the suction process is performed once" for the suction process of the second time and the following suction processes on one accommodation container 2 is a "condition on which the previous suction process ends".

Figure 23:
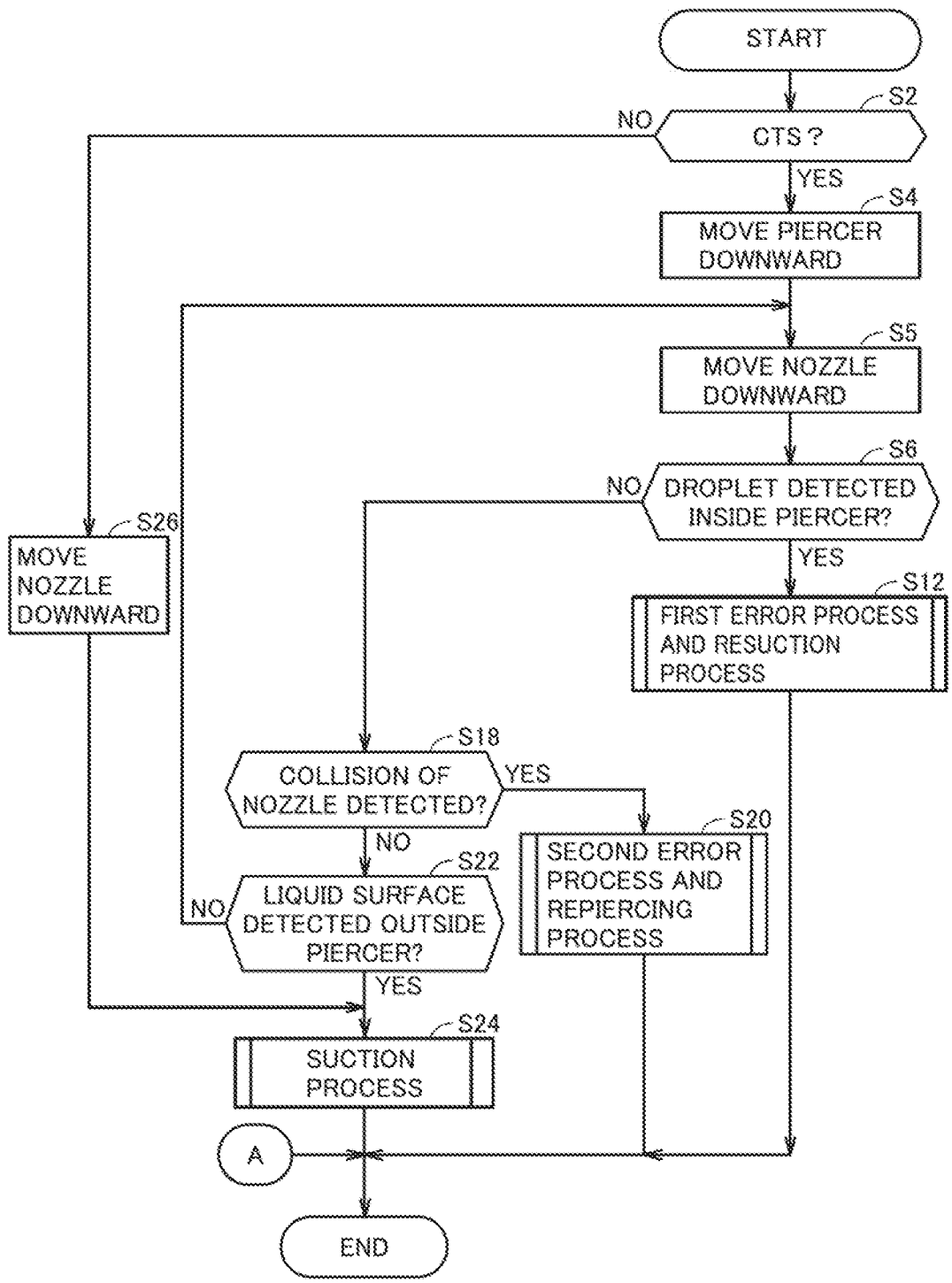
FIG. 23 is an example flowchart of the controller.

FIG. 23 shows a main flow of controller 500. At step S2 of FIG. 23, controller 500 determines whether rack 3 holding accommodation container 2 that accommodates a sample is the CTS rack or SAM rack. When controller 500 determines that rack 3 holding accommodation container 2 that accommodates a sample is the CTS rack (YES at step S2), the process proceeds to step S4.

At step S4, controller 500 moves piercer 7 downward (starts moving piercer 7 downward). When moving piercer 7 downward ends, the process proceeds to step S5. At the point of time at which moving piercer 7 downward has ended, piercer 7 has pierced cover member 22 in one case, while piercer 7 has not pierced cover member 22 in another case. At step S5, controller 500 starts moving the nozzle downward. Subsequently, the process proceeds to step S6. At step S6, controller 500 then determines whether droplet 610 has been detected inside piercer 8. When controller 500 determines at step S6 that droplet 610 has been detected inside piercer 8 (YES at step S6), the process proceeds to step S12. At step S12, controller 500 performs the first error process and the resuction process. The processes of step S12 will be described below. When droplet 610 has not been detected inside the piercer 8 at step S6 (NO at step S6), the process proceeds to step S18.

At step S18, controller 500 determines whether the collision of nozzle 8 with cover member 22 has been detected. When controller 500 determines at step S18 that the collision of nozzle 8 with cover member 22 has been detected (YES at step S18), the process proceeds to step S20. At step S20, controller 500 performs the second error process and the repiercing process. The processes of step S20 will be described below.

When controller 500 determines at step S18 that the collision of nozzle 8 with cover member 22 has not been detected inside piercer 7 (NO at step S18), the process proceeds to step S22.

At step S22, controller 500 determines whether a liquid surface has been detected outside piercer 7. When determination is NO at step S22, the process returns to step S5 to continue moving nozzle 8 downward. When determination is YES at step S22, the process proceeds to step S24. At step S24, controller 500 performs the suction process. The process of step S24 will be described below.

When determination is NO at step S2, that is, when the sample in accommodation container 2 which is not covered with cover member 22 is suctioned, the process proceeds to step S26. At step S26, controller 500 moves nozzle 8 downward (starts moving nozzle 8 downward). When the process of step S26 ends, the process proceeds to step S24.

Figure 24:
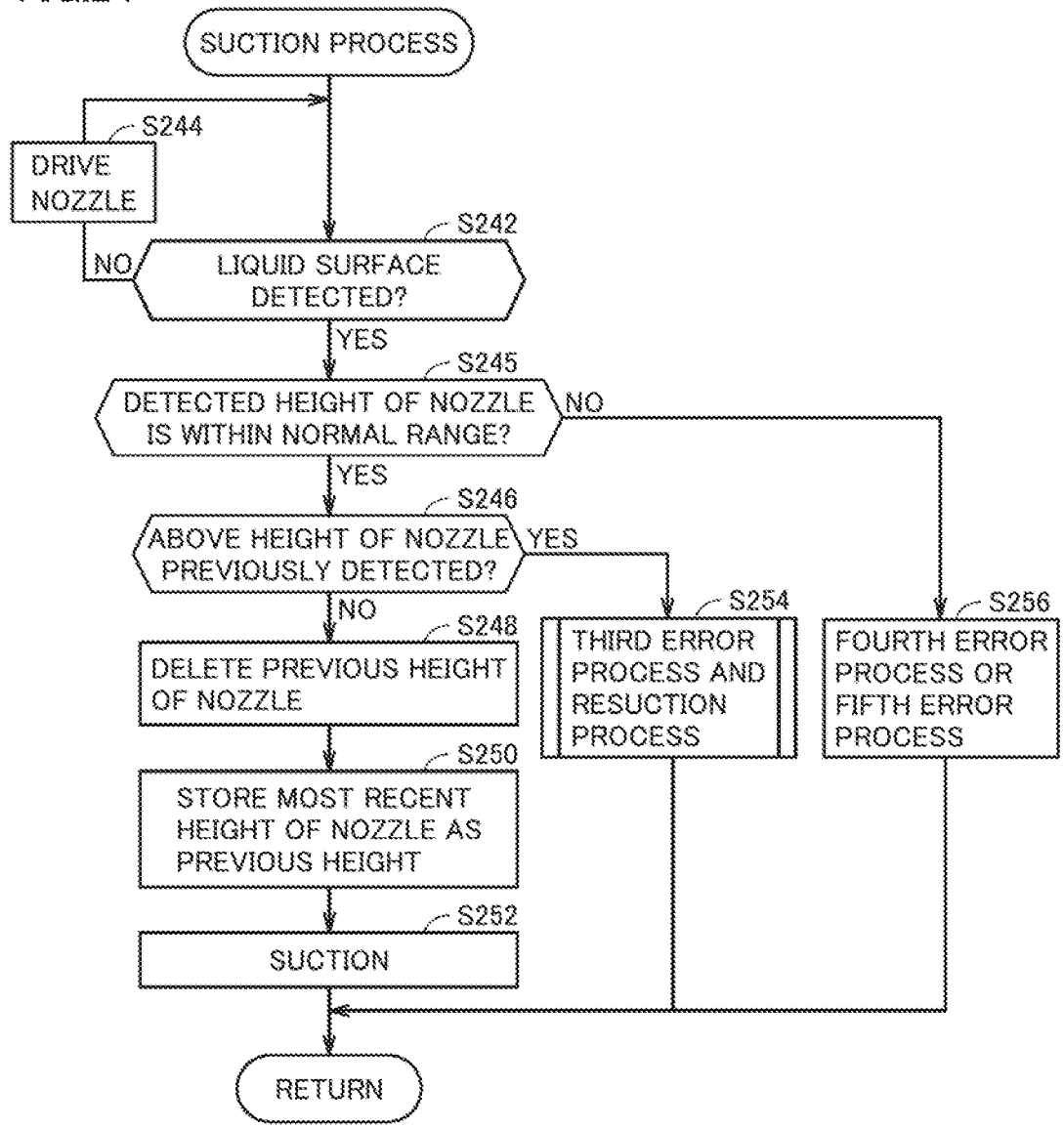
FIG. 24 is an example flowchart of a suction process.

FIG. 24 is a flowchart of the "suction process" of step S24. At step S242, controller 500 determines whether nozzle 8 has detected a liquid surface. When determination is NO at step S242, controller 500 drives (i.e., moves downward) nozzle 8 at step S244. Controller 500 repeats the processes of step S242 and step S244 until nozzle 8 detects a liquid surface. Note that at step S242 in step S24 after the determination is YES at step S22, determination is YES.

When determination is YES at step S242, the process proceeds to step S245. At step S245, controller 500 determines whether the height of nozzle 8 at the detection of the liquid surface is within the normal range (see FIG. 16). When determination is NO at step S245, the process proceeds to step S256. At step S256, controller 500 performs the fourth error process or the fifth error process. Typically, when determining that the height of nozzle 8 is above the upper limit at step S256, controller 500 performs the fourth error process. Typically, when determining that the height of nozzle 8 is below the lower limit, at step S256, controller 500 performs the fifth error process. The process then ends.

At step S246, controller 500 determines whether the most recent height of nozzle 8 "is above the previous height of nozzle 8 and whether the difference between the most recent height and the previous height is not smaller than the threshold". When controller 500 determines at step S246 that the most recent height of nozzle 8 is above the previous height of nozzle 8 and the difference between the most recent height and the previous height is not less than the threshold (i.e., when determination is YES at step S246), the process proceeds to step S254. Contrastingly, when determination is NO at step S246, the process proceeds to step S248. At step S246 of FIG. 24, the words "ABOVE HEIGHT OF NOZZLE PREVIOUSLY DETECTED?" are shown in a simplified manner.

At step S248, controller 500 deletes the previous height of the nozzle. At step S250, then, the most recent height of nozzle 8 (i.e., the height of nozzle 8 for which determination is YES at step S242) is stored in storage device 534 as the previous height. The previous height stored at step S242 is used at step S246 in the next suction process. At step S252, controller 500 then causes nozzle 8 to suction a sample.

Figure 25:
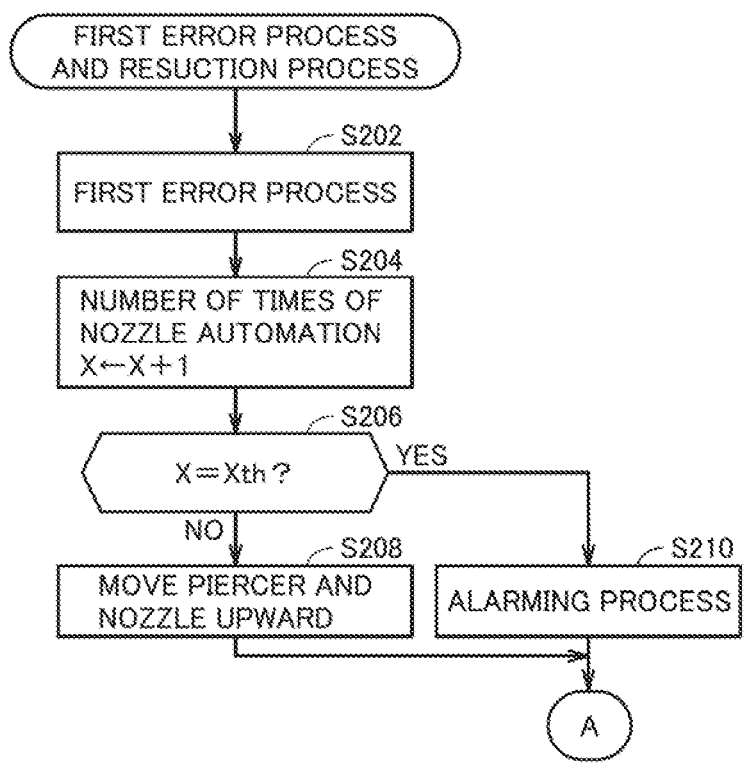
FIG. 25 is an example flowchart of a first error process and a resuction process.

Next, an example flowchart (subroutine) of the first error process and resuction process at step S12 will be described. FIG. 25 is an example flowchart of the first error process and resuction process.

At step S202, controller 500 performs the first error process. At step S204, controller 500 then increments a number of times of nozzle automation X by one. Herein, number of times of nozzle automation X is a number of times indicating the number of times by which the resuction process of nozzle 8 is performed. An initial value of number of times of nozzle automation X is set to zero. At step S206, controller 500 determines whether number of times of nozzle automation X has reached a prescribed value Xth. Prescribed value Xth corresponds to a "first prescribed number of times" of the present disclosure. When determining at step S206 that number of times of nozzle automation X has reached prescribed value Xth (YES at step S206), controller 500 performs the alarming process at step S210. Herein, the alarming process of step S210 is an alarming process different from the alarming process of the first error process of step S202. The alarming process of step S210 may be the same alarming process as the alarming process of the first error process of step S202. When the alarming process ends, the entire process ends.

When controller 500 determines at step S206 that number of times of nozzle automation X has not reached prescribed value Xth (NO at step S206), controller 500 moves piercer 7 and nozzle 8 upward at step S208, and then, the process ends. Note that controller 500 cleans and dries piercer 7 pulled out of accommodation container 2 using a prescribed cleaning mechanism or the like, which is not particularly shown in FIG. 25.

Figure 26:
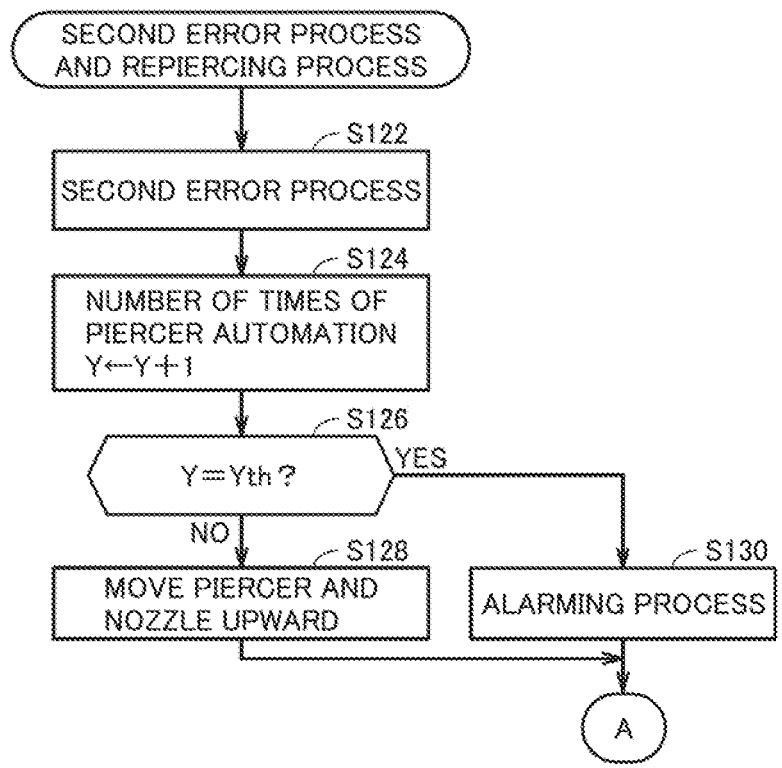
FIG. 26 is an example flowchart of a second error process and a repiercing process.

Next, an example flowchart (subroutine) of the second error process and repiercing process of step S20 will be described. FIG. 26 is an example flowchart of the second error process and repiercing process.

At step S122, controller 500 performs the second error process. At step S124, controller 500 then increments a number of times of piercer automation Y by one. Herein, number of times of piercer automation Y is a number of times indicating the number of times by which the repiercing process of piercer 7 is performed. An initial value of number of times of piercer automation Y is zero. At step S126, controller 500 determines whether number of times of piercer automation Y has reached a prescribed value Yth. Prescribed value Yth corresponds to a "second prescribed number of times" of the present disclosure. Prescribed value Yth is associated with specimen identification information (e.g., specimen bar code). Prescribed value Yth and the specimen identification information associated with prescribed value Yth are stored in a prescribed area. When determining at step S126 that number of times of piercer automation Y has reached prescribed value Yth (YES at step S126), controller 500 performs the alarming process at step S130. Herein, the alarming process of step S130 is an alarming process different from the alarming process of the second error process of step S122. When the alarming process ends, the entire process ends.

When controller 500 determines at step S126 that number of times of piercer automation Y has not reached prescribed value Yth (NO at step S126), controller 500 moves piercer 7 and nozzle 8 upward at step S128, and then, the process ends. Note that controller 500 cleans and dries piercer 7 pulled out of accommodation container 2 using a prescribed cleaning mechanism or the like, which is not particularly shown in FIG. 26.

Figure 27:
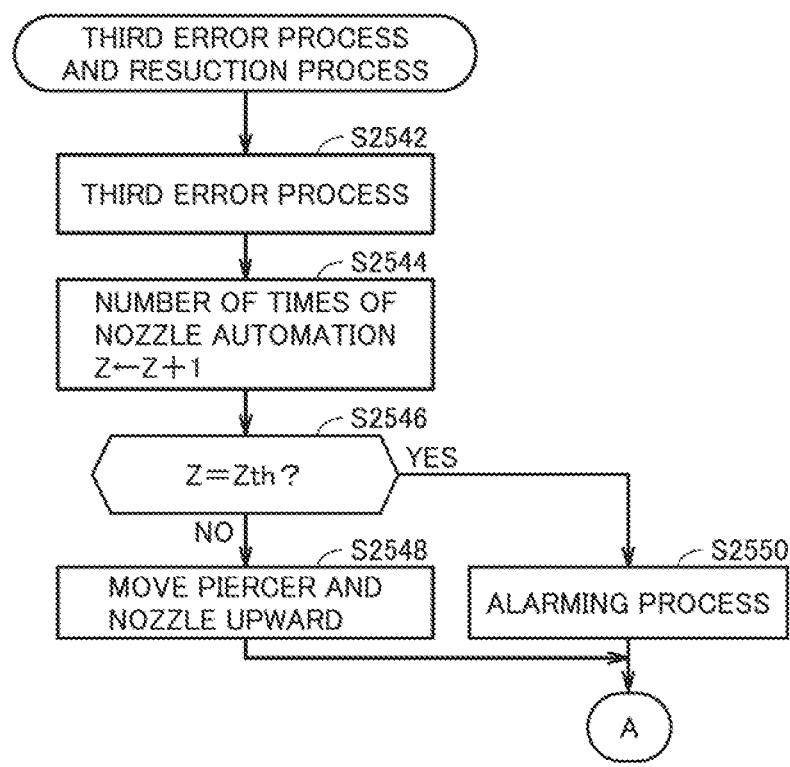
FIG. 27 is an example flowchart of a third error process and a resuction process.

Next, an example flowchart (subroutine) of the third error process and resuction process of step S254 will be described. FIG. 27 shows an example flowchart of the third error process and resuction process.

At step S2542, controller 500 performs the third error process. At step S2544, controller 500 then increments a number of times of nozzle automation Z by one. Herein, number of times of nozzle automation Z is a number of times by which the resuction process of nozzle 8 is performed. The initial value of number of times of nozzle automation Z is zero. At step S2546, controller 500 determines whether number of times of nozzle automation Z has reached a prescribed value Zth. When determining at step S2546 that number of times of nozzle automation Z has reached prescribed value Zth (YES at step S2546), controller 500 performs the alarming process at step S130. The alarming process of step S2550 is an alarming process different from the alarming process of the third error process of step S2542. When the alarming process ends, the entire process ends.

When controller 500 determines at step S2546 that number of times of nozzle automation Z has not reached prescribed value Zth (NO at step S2546), controller 500 moves piercer 7 and nozzle 8 upward at step S2548. Then, the process ends. Note that controller 500 cleans and dries piercer 7 pulled out of accommodation container 2 using a prescribed cleaning mechanism, which is not particularly shown in FIG. 26. Subsequently, the process returns to step S2. Number of times of piercer automation Y and number of times of nozzle automation X may be the same. Alternatively, number of times of piercer automation Y and number of times of nozzle automation X may be different from each other.

After the processes of step S208 of FIG. 25, step S128 of FIG. 26, and step S2548 of FIG. 27 end, the process of step S2 and the following processes are performed again, and accordingly, the resuction process is performed virtually. In the processes of step S210 of FIG. 25, step S130, and step S2550, the analysis process may end together with the alarming process.

Controller 500 may store at least one prescribed value of prescribed value Xth, prescribed value Yth, and prescribed value Zth and specimen identification information in correspondence with each other.

Embodiment 2

Embodiment 1 has described that analysis apparatus 1 uses collision sensor 809 (see FIG. 9) to notify that piercer 7 has not pierced cover member 22. However, analysis apparatus 1 may notify that piercer 7 has not pierced cover member 22, using another member. In Embodiment 2, analysis apparatus 1 detects that piercer 7 has not pierced cover member 22, using a piezoelectric element.

Figure 28:
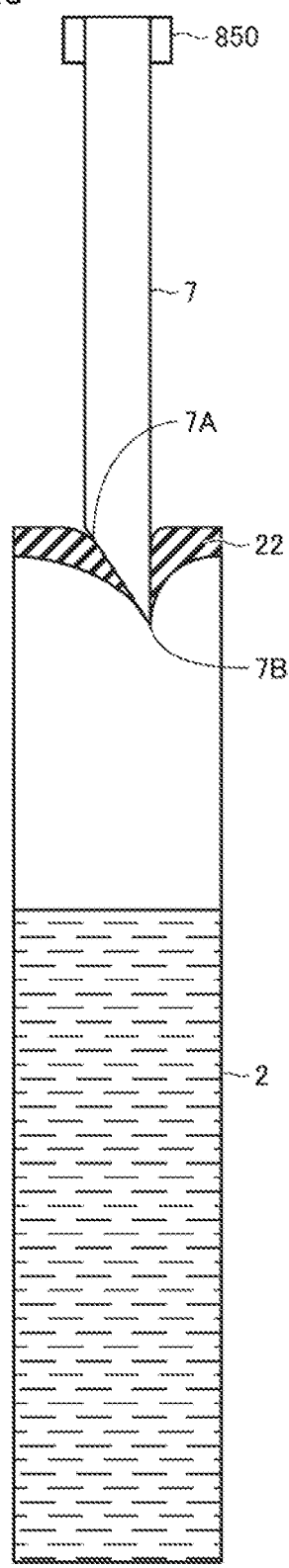
FIG. 28 is a sectional view of a piercer and an accommodation container of Embodiment 2.

FIG. 28 is a sectional view of piercer 7 and accommodation container 2 of Embodiment 2. A piezoelectric element 850 is provided on the periphery of piercer 7. In the example of FIG. 28, piezoelectric element 850 is provided near the tip of piercer 7. In the example of FIG. 28, piezoelectric element 850 is provided in a location above tapered surface 7A of piercer 7.

Piezoelectric element 850 is connected to controller 500. Piezoelectric element 850 performs a conversion into a voltage corresponding to a force applied to piezoelectric element 850 and outputs a current based on a value of the voltage to controller 500. Controller 500 determines the force applied to piezoelectric element 850 based on this current.

Figure 29A:
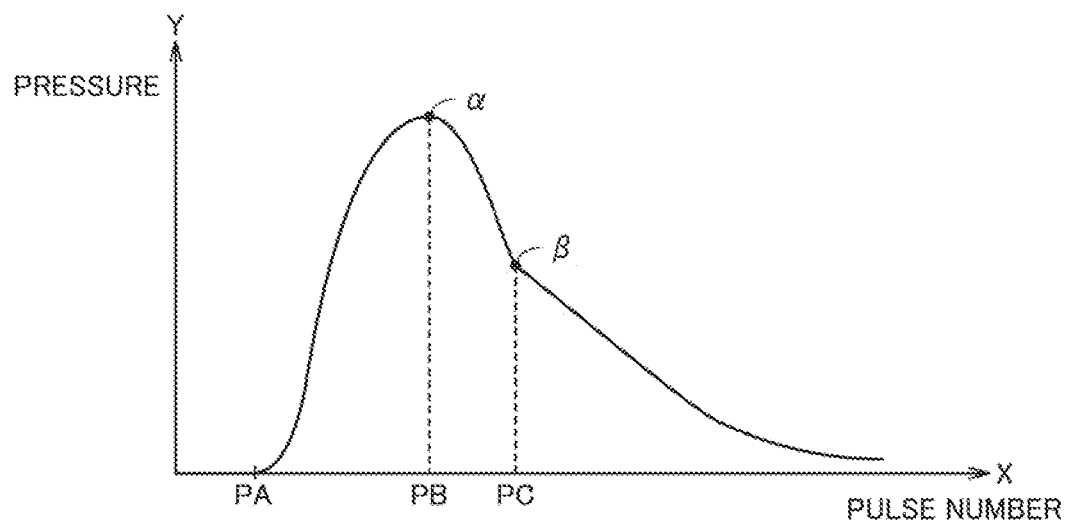
FIGS. 29A and 29B each show a relationship between a pressure applied to a piezoelectric element and a pulse number output to a piercer motor by a controller.
Figure 29B:
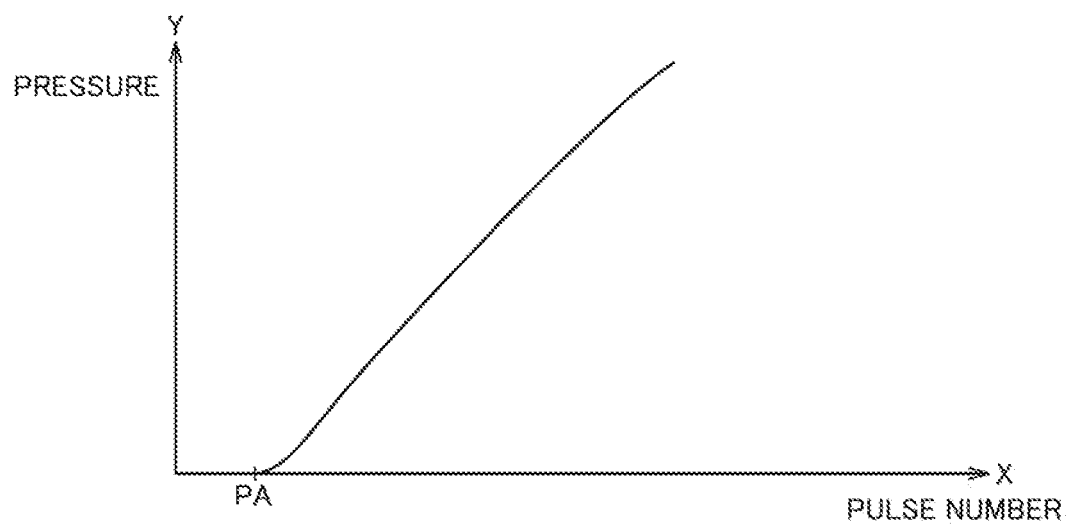

FIGS. 29A and 29B each show a relationship between a pressure applied to piezoelectric element 850 and a pulse number output to piercer motor 713 by controller 500. In FIG. 29, the X axis represents a pulse number output to the piercer motor by controller 500, and the Y axis represents a pressure applied to piezoelectric element 850.

FIG. 29A shows a case where piercer 7 has pierced cover member 22. FIG. 29B shows a case where piercer 7 has not pierced cover member 22.

In the example of FIG. 29A, the value of a pressure to piezoelectric element 850 is zero during a period in which the pulse number is zero to PA. The period in which the pulse number is zero to PA is a period from a time at which the piecer is located at the initial position to at a time at which piercer 7 contacts cover member 22. A period in which the pulse number is PA to PB is a period from the time at which piercer 7 contact with cover member 22 to a time at which a tip 7B of piercer 7 presses cover member 22.

A period in which the pulse number is PB to PC is a period from the time at which tip 7B of piercer 7 presses cover member 22 to a time at which tip 7B of piercer 7 pierces cover member 22. In the example of FIG. 29A, a time at which the pulse number is PB is a time at which cover member 22 extends and tip of 7B of piercer 7 projects most. Subsequently, when the pulse number is equal to PC, it is assumed that tip 7B of piercer 7 has penetrated cover member 22.

In the example of FIG. 29A, there are a point of inflection α and a point of inflection β as points at which an increasing pressure value starts decreasing as the pulse number increases (see pulse number PB and pulse number PC of FIG. 29A). Point of inflection α is a point at which the pressure value changes from increasing to decreasing. Point of inflection β is a point at which the degree (gradient) of change of a decrease in the pressure value starts decreasing.

Contrastingly, in FIG. 29B, pressure changes during a period in which the pulse number is zero to PA as in FIG. 29A. In FIG. 29B, there are no "points at which an increasing pressure value starts decreasing as the pulse number increases" when the pulse number is not less than PA.

In this manner, in the present embodiment, when point of inflection β is detected as the pulse number is increased, controller 500 determines that piercer 7 has pierced cover member 22. When point of inflection β is not detected as the pulse number is increased, controller 500 determines that piercer 7 has not pierced cover member 22.

Embodiment 3

Analysis apparatus 1 of Embodiment 3 includes a third sensor that detects the state of collision between piercer 7 and cover member 22. Cover member 22 is generally made of a material resistant to piercing, such as a rubber material. Piercer driving device 71 accordingly drives piercer 7 with a large force. When piercer 7 collides with impurities, which may be mixed in accommodation container 2, for example, accommodation container 2 would be damaged because piercer 7 is driven with a large force. Also when piercer 7 is driven with a large force with piercer 7 not piercing cover member 22, for example, accommodation container 2 would be damaged.

Thus, analysis apparatus 1 of the present embodiment performs the sixth error process based on the detection of a collision of piercer 7 (e.g., non-piercing into cover member 22) while piercer 7 is being moved downward. In the present embodiment, when detecting the state of collision of piercer 7 with cover member 22 and also detecting the state of collision even in the case where piercer 7 has been driven by an amount of additional pulse, which will be described below, analysis apparatus 1 detects "the state of non-piercing of piercer 7 into cover member 22". Herein, the "state of collision" is a state in which a prescribed amount of force F is applied upward to piercer 7, driven downward, by cover member 22 when piercer 7 is in contact with cover member 22 (see FIG. 30B).

The sixth error process includes at least one of a six alarming process and a sixth error storing process. The six alarming process includes a process of outputting a six alarm sound from speaker 722 and a process of displaying an error image on display device 250. The six alarm sound is a sound indicating that piercer 7 has failed to pierce cover member 22. The sixth error image is an image indicating that piercer 7 has failed to pierce cover member 22. The sixth error image corresponds to the P mistake described above. The sixth error storing process is a process of storing an error history in a prescribed storage area. The prescribed storage area may be a storage area of analysis apparatus 1 or a storage area of the external device to analysis apparatus 1. Further, when the error storing process is performed, and when the user performs an operation of displaying the sixth error image on input device 200, the stored error history is displayed on display device 250. A collision sensor that detects the state of collision and the state of non-piercing will be described below.

Figure 30A:
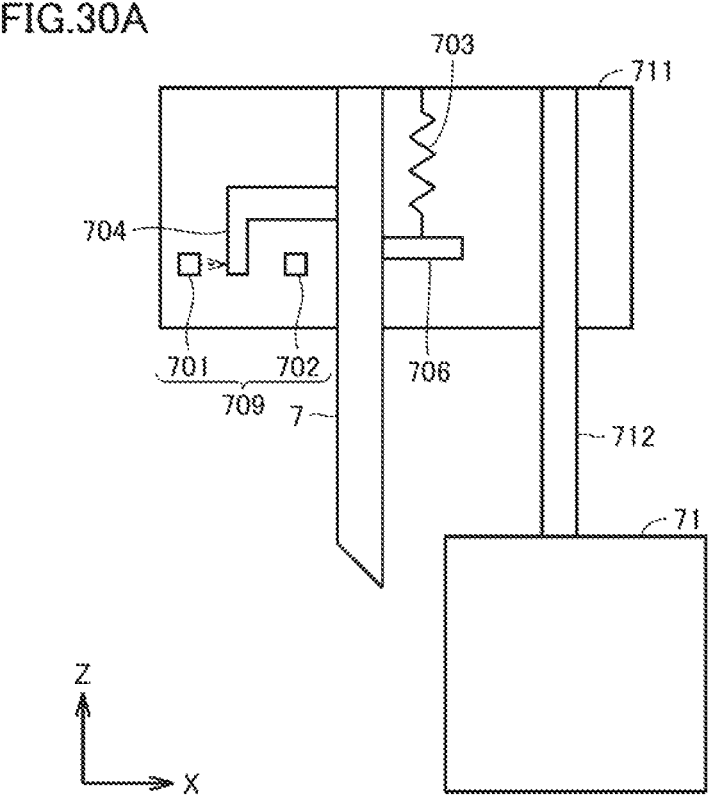
FIGS. 30A and 30B are views for illustrating a sensor in the state of non-piercing.
Figure 30B:
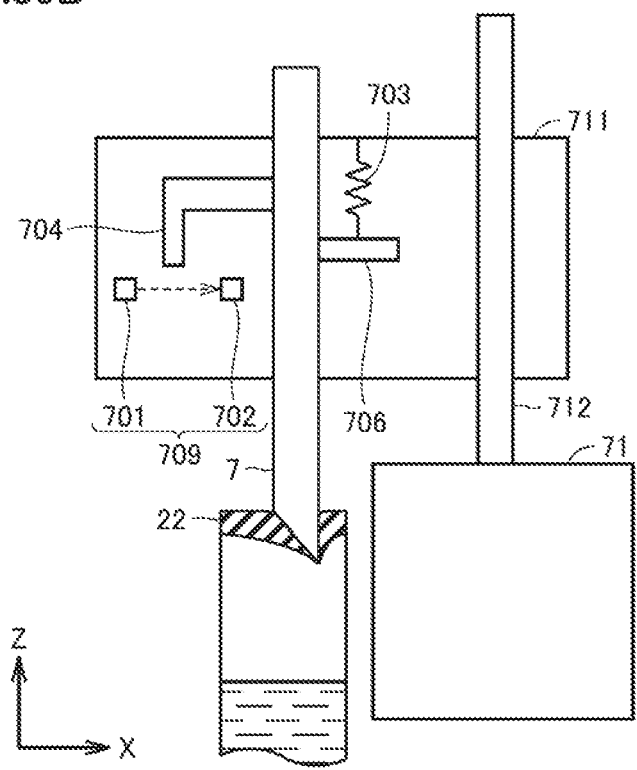

FIGS. 30A and 30B are views for illustrating the collision sensor. FIGS. 30A and 30B each show the inside of piercer arm 711. FIG. 30A shows a situation where piercer 7 is not in the state of collision. FIG. 30B shows a situation where piercer 7 is in the state of collision.

A biasing member 703, a holding member 706, a light shielding plate 704, and a collision sensor 709 are arranged in piercer arm 711. Collision sensor 709 corresponds to a "sixth sensor" of the present disclosure. Biasing member 703 is, for example, a spring, more particularly, a helical compression spring. Biasing member 703 has one end attached to the inner surface of piercer arm 711. Biasing member 703 has the other end held on holding member 706. Holding member 706 holds biasing member 703 and is also joined to the periphery of piercer 7. Biasing member 703 thus biases piercer 7 downward in the Z-axis direction.

Light shielding plate 704 has an L shape in sectional view. Light shielding plate 704 has one end joined to the periphery of piercer 7. Collision sensor 709 includes a light output portion 701 and a light input portion 702. Light output portion 701 outputs light to light input portion 702. In a situation where light enters light input portion 802, an optical signal is transmitted to controller 500. The optical signal is a signal indicating that light enters light input portion 702.

Piercer driving device 71 moves rotary shaft 712 downward to move piercer 7 downward. As shown in FIG. 30A, when piercer 7 is not in the state of collision, the light from light output portion 701 is prevented from entering light input portion 702 by light shielding plate 704. As described above, a force of biasing member 703 is applied downward to piercer 7. In the situation where piercer 7 is not in the state of collision (e.g., in a situation where piercer 7 begins colliding with a collision object), thus, the state in which no light enters light input portion 702 (i.e., the state shown in FIG. 30A) is maintained by the force applied to piercer 7.

However, when piercer driving device 71 moves piercer 7 downward further from the time at which piercer 7 has begun contacting cover member 22, piercer 7 is held back by cover member 22, and accordingly, a force is applied to piercer 7 upward in the Z-axis direction. Then, as piercer 7 continues moving downward, and accordingly, the force applied upward to piercer 7 exceeds the force applied downward to piercer 7 by biasing member 703, piercer 7 moves upward relative to piercer arm 711, as shown in FIG. 30B. Herein, the "prescribed amount of force F" corresponds to the "force exceeding the force applied downward to piercer 7 by biasing member 703".

As piercer 7 moves upward relative to piercer arm 711, light shielding plate 704 joined to piercer 7 also moves upward. As light shielding plate 704 moves upward, light from light output portion 701 is no longer shielded by light shielding plate 704, as shown in FIG. 30B. Consequently, light enters light input portion 702. When light enters light input portion 702, an optical signal from light input portion 702 is supplied to controller 500. Controller 500 determines that piercer 7 is in the state of collision upon input of an optical signal.

The examples of FIGS. 30A and 30B show a configuration in which piercer 7 and rotary shaft 712 project from piercer arm 711 as piercer 7 moves upward relative to piercer arm 711. The examples of FIGS. 30A and 30B also show a configuration in which the state in which no light enters light input portion 702 changes to the state in which light enters light input portion 702 as piercer 7 moves upward relative to piercer arm 711. In a configuration of a modification, the state in which light enters light input portion 702 may change to the state in which no light enters light input portion 702 as piercer 7 moves upward relative to piercer arm 711.

In other words, analysis apparatus 1 includes light output portion 701 that outputs light, light input portion 702 that receives light, and biasing member 703. Biasing member 703 applies a force downward (i.e., toward accommodation container 2) to piercer 7. When piercer 7 moves upward relative to piercer arm 711 and the light entrance state of light input portion 702 changes, controller 500 determines that piercer 7 is in the state of collision. The change in the light entrance state of light input portion 702 may be a "change from the state in which no light enters light input portion 702 to the state in which light enters light input portion 702", as in the present embodiment. Alternatively, a change in the light entrance state of light input portion 702 may be a "change from the state in which light enters light input portion 702 to the state in which no light enters light input portion 702", as in the modification.

Even when controller 500 determines the state of collision, controller 500 may move piercer 7 downward further to allow piercer 7 to pierce cover member 22. In the present embodiment, thus, even when controller 500 determines the state of collision, the process of moving piercer 7 downward is performed further by outputting a prescribed amount of pulse to piercer motor 713 of piercer driving device 71. The pulse to be output is referred to as an "additional pulse" below. The additional pulse corresponds to "a prescribed amount of driving" of the present disclosure.

When piercer 7 pierces cover member 22 as controller 500 outputs the additional pulse to piercer motor 713, controller 500 performs the following process, that is, the process of driving nozzle 8. Contrastingly, when piercer 7 fails to pierce cover member 22 even in the case where controller 500 outputs the additional pulse to piercer motor 713, controller 500 determines the "state of non-piercing" and also performs the sixth error process.

In the present embodiment, when controller 500 outputs an additional pulse to piercer motor 713, and when piercer 7 pierces cover member 22, the application of upward force to piercer 7 is released. When the application of an upward force to piercer 7 is released, the light entrance state of light input portion 702 changes to the "no-light entrance state" owing to the downward force from biasing member 703 to piercer 7. When controller 500 determines the change to the no-light entrance state, controller 500 determines that piercer 7 has pierced cover member 22. Contrastingly, when this light entrance state is continued even in the case where controller 500 outputs the additional pulse to piercer motor 713, controller 500 determines that piercer 7 has failed to pierce cover member 22 (i.e., the state of non-piercing).

In other words, in the present embodiment, controller 500 determines that piercer 7 has pierced cover member 22 when controller 500 performs the processes in order of "determining the light entrance state of light input portion 702", "outputting an additional pulse", and "determining the no-light entrance state of light input portion 702". Contrastingly, when controller 500 performs the processes in order of "determining the light entrance state of light input portion 702", "applying an additional pulse", and "determining the light entrance state of light input portion 702", controller 500 determines the state of non-piercing of piercer 7 into cover member 22.

Controller 500 performs the sixth error process based on the detection by collision sensor 709 that piercer 7 has collided with the cover. More specifically, controller 500 performs the sixth error process (a) after detection of the state of collision (i.e., after a change to the light entrance state), (b) when piercer 7 is driven by a prescribed amount of driving (i.e., when an additional pulse is output to piercer motor 713", and (c) when the state of collision is continued (i.e., when the light entrance state is continued).

In a modification, controller 500 may be able to detect that piercer 7 is at rest even though controller 500 outputs a pulse to piercer motor 713. In this case, (c) the case where detection by the second sensor is performed may be a "case where controller 500 detects that piercer 7 is at rest".

In the present embodiment, the additional pulses are set to vary per type of cover member 22. FIG. 31 shows example settings of additional pulses. In FIG. 31, a first cover member and a second cover member are defined.

The first cover member is a material more extensible than the second cover member. For piercer 7 to pierce the cover member, thus, the first cover member needs a larger pulse number than the second cover member. In the present embodiment, thus, a pulse corresponding to the first cover member is P2, and a pulse corresponding to the second cover member is P1, where P2>P1.

Information indicating the settings of FIG. 31 is stored in a second storage device 5342. Second storage device 5342 is included in storage device 534 (see FIG. 2).

When controller 500 determines that piercer 7 has not pierced cover member 22, that is, when controller 500 performs the sixth error process, controller 500 performs the repiercing process of piercer 7. The repiercing process of piercer 7 is a process of causing piercer 7 to pierce cover member 22 again when piercer 7 has failed to pierce cover member 22. The repiercing process is a process of moving piercer 7 upward once and moving piercer 7 downward again to for an attempt to pierce cover member 22.

A restricted number of times is defined for the number of times of the repiercing process. If controller 500 performs the repiercing process many times, a fragment of cover member 22 would be mixed in sample 17 as a result of the collision of piercer 7 with cover member 22. If controller 500 performs the repiercing process many times, piercer 7 would be damaged as a result of the collision of piercer 7 with cover member 22.

Thus, "a possibility that a fragment of cover member 22 would be mixed in sample 17" and "a possibility that piercer 7 would be damaged" can be reduced by setting a restricted number of times on the number of times of the repiercing process. The restricted number of times corresponds to a "third prescribed number of times" of the present disclosure. The restricted number of times is, for example, "twice".

Controller 500 performs the repiercing process until the number of times of the repiercing process reaches a prescribed number of times. When the number of times of the repiercing process reaches the prescribed number of times, controller 500 issues an alarm. Issuing an alarm is, for example, outputting an alarm sound from speaker 722. The collision of piercer 7 is detected at, for example, step S4 of FIG. 23. When the collision of piercer 7 is detected, for example, the process of step S20 is performed. The prescribed number of times of the repiercing process corresponds to Yth of FIG. 26.

Embodiment 4

In the present embodiment, an error message in the case where an error of S up is detected is different from those in the above embodiments. Causes of occurrence of the error of S up include the following three causes. A first cause is a cause that air bubble 612 has been detected in accommodation container 2 (see FIG. 15C). A second cause is a cause that the first height is above the second height and the difference between the first height and the second height is not less than a threshold. The second cause may occur when, for example, liquid surface 17A is curved and nozzle 8 contacts an edge of the curved shape, as shown in FIG. 15D, due to an impact on analysis apparatus 1 or the like. A third cause is a cause that nozzle 8 has contacted droplet 610 inside piercer 7 (see FIG. 11).

In the present embodiment, when an error of S up is detected, then, controller 500 displays a notification indicating that there is a possibility that air bubble 612 would have been detected inside accommodation container 2, a possibility that first height H1 would be above second height H2 and a difference between first height H1 and second height H2 would not be less than the threshold, or a possibility that nozzle 8 would have contacted droplet 610 inside piercer 7.

Figure 32:
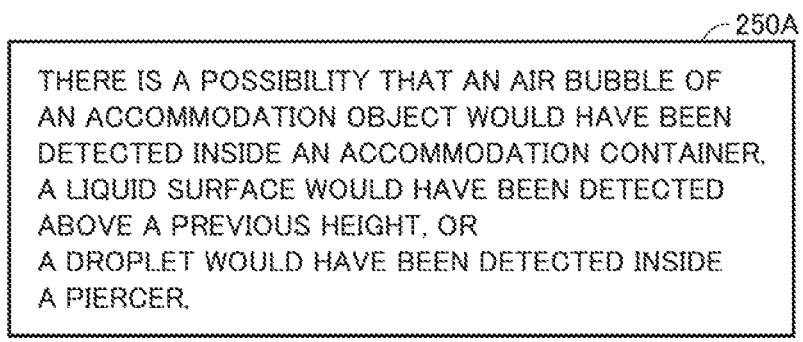
FIG. 32 shows another example type of a cover member of another embodiment.

FIG. 32 shows an example display screen of the present embodiment. In the example of FIG. 32, a screen "there is a possibility that an air bubble of an accommodation object would have been detected inside an accommodation container, a liquid surface would have been detected above a previous height, or a droplet would have been detected inside a piercer" is displayed. As such a screen is displayed, the user can recognize the cause of occurrence of an error of S up.

Other Embodiments (1) The above embodiments have mainly described the case where nozzle 8 suctions a sample. However, an object suctioned by nozzle 8 may be a reagent. The reagent may be accommodated in the accommodation container covered with cover member 22. The reagent may be accommodated in the accommodation container which is not covered with cover member 22 with its opening exposed. In the present disclosure, the reagent and the specimen are each referred to as an "accommodation object". Accommodation container 2 accommodates an accommodation object. Liquid surface sensor 82 detects a liquid surface of the accommodation object.

(2) The above embodiments have described that an amount of driving of nozzle 8 is used as a technique of detecting contact of nozzle 8 with droplet 610 inside piercer 7 by controller 500. However, controller 500 may detect contact of nozzle 8 with droplet 610 inside piercer 7. For example, analysis apparatus 1 may include an imaging device that takes an image of the inside of piercer 7. When the imaging device takes an image of contact with droplet 610 inside piercer 7, controller 500 may detect contact of nozzle 8 with droplet 610 inside piercer 7.

(3) The above embodiments have mainly described display of an error as the notification of an error. However, the notification of an error is not limited to display of an error, and another technique may be used. For example, the notification of an error may be outputting a voice indicating the occurrence of an error, or printing information indicating the occurrence of an error on a sheet of paper and outputting the sheet of paper.

[Summary]

(1-1) Controller 500 stores a position of nozzle 8, which is obtained at the detection of nozzle 8 with an accommodation object (in the present embodiment, a sample), in storage device 534 (see step S250 of FIG. 24). Controller 500 also provides an error notification based on the most recent height of nozzle 8, which is obtained when nozzle 8 has contacted an accommodation object by liquid surface sensor 82, being above the previous height of nozzle 8, which is obtained at the previous detection of contact of nozzle 8 with the accommodation object by liquid surface sensor 82 and which is stored in the storage device (see S up of FIG. 18, and the third error process of step S254 of FIG. 24).

The error notification is provided in a different manner from that of another error (e.g., an error of P mistake, an error of S mistake, an error of S shortage).

With such a configuration, an error notification is provided based on the most recent height of the nozzle, which is obtained when nozzle 8 has contacted the accommodation object, being above the previous height of the nozzle, which is obtained at the previous detection. For example, when an air bubble or the like is generated above an accommodation object and the nozzle contacts the air bubble as shown in FIG. 15C, an error notification is provided. The error notification is provided in a different manner from that of an error notification at detection of another error. Since an error notification is provided upon detection of contact of a nozzle with an accommodation object inside a piercer and upon detection of a collision of a nozzle with a cover member, thus, the user can easily recognize a factor by which the analysis apparatus has failed to suction an accommodation object. Since nozzle 8 does not suction an accommodation objet when the error notification is provided, thus, the execution of idle suction of an accommodation object can be reduced. When the user checks the error notification to find that the accommodation object is in an abnormal state (e.g., when an air bubble is generated in an accommodation object), for example, the user may change accommodation container 2 to immediately remove the abnormal state of the accommodation object. This can prevent unnecessary consumption of an accommodation object and an unnecessary analysis of a specimen.

(1-2) Controller 500 determines whether the most recent height is above the previous height (e.g., see step S246 of FIG. 24). Also, when the most recent height is above the previous height and the difference between the most recent height and the previous height is not less than the threshold, controller 500 performs the third error process. For example, when the most recent height is as shown in FIG. 15C, controller 500 performs the third error process. With such a configuration, controller 500 does not perform the third error process when the most recent height is above the previous height but the difference between the most recent height and the previous height is less than the threshold. For example, when the most recent height is as shown in FIG. 15D, controller 500 does not perform the third error process. Controller 500 can thus avoid unnecessary execution of the third error process.

(1-3) Acceptance unit 542 of controller 500 accepts a threshold change through the screen shown in FIG. 20.

With such a configuration, the user can change the threshold, leading to improved user's convenience.

(1-4) Controller 500 deletes the previous height stored in the storage device after determining whether the most recent height is above the previous height (see step S248 of FIG. 24).

With such a configuration, a plurality of second heights can be prevented from remaining in the storage device, reducing the storage capacity of the storage device.

(1-5) Controller 500 performs the process of controlling nozzle 8 to suction the accommodation object again (resuction process) and also provides an error notification (third error process), as shown in step S254 of FIG. 24.

With such a configuration, nozzle 8 is caused to perform the resuction process, and accordingly, nozzle 8 can be caused to suction an accommodation object without any delay.

(1-6) Acceptance unit 542 of controller 500 accepts whether to transmit an error notification based on an error process to host device 270, through the screen shown in FIG. 21.

With such a configuration, the user is allowed to select whether to transmit an error notification to host device 270, leading to improved user's convenience.

(1-7) Controller 500 provides, as an error notification, a notification indicating a possibility that an air bubble of an accommodation object would have been detected inside accommodation container 2, a first height would be above a second height and a difference between the first height and the second height would not be smaller than a threshold, or the nozzle would have contacted a droplet inside a piercer, as shown in FIG. 32. The user can thus recognize that there is a possibility that an air bubble of an accommodation object would have been detected inside accommodation container 2, the first height would be above the second height and a difference between the first height and the second height would not be smaller than a threshold, or the nozzle would have contacted a droplet inside a piercer.

(1-8) Analysis mechanism 723 can analyze a specimen in accordance with a plurality of analysis categories. Also, display device 250 displays identification information for identifying a specimen (specimen column 951 of FIG. 17) and a plurality of analysis categories (analysis category column 956 of FIG. 17), as shown in FIG. 17. Upon detection of an error of S up, analysis mechanism 723 analyzes the specimen in accordance with analysis categories other than an analysis category for which an error has been detected among the plurality of analysis categories. Upon detection of an error, controller 500 displays error information 972 about S up in association with a specimen and also displays error information 976 in association with the analysis category for which the error has been detected among the plurality of analysis categories, as an error notification, as shown in FIG. 18. Controller 500 displays at least one piece of error information among the error information associated with a specimen and the error information associated with the analysis category for which the error has been detected, in a manner different from that of the error information indicating that another error has been detected. In the example of FIG. 17, the error information about S up is displayed in orange, and error information about another error (e.g., an error of P mistake) is displayed in pink.

Upon detection of an error of S up, analysis mechanism 723 performs analyses in accordance with categories other than a category for which the error of S up has been detected among a plurality of categories including the category for which the error of S up has been detected, as described above. Thus, upon detection of an error of S up, controller 500 can thus alert the user to select any of an analysis result through an analysis in accordance with the analysis categories other than the analysis category for which the error of S up has been detected (analysis of analysis result 961 of FIG. 18) and an analysis result through a reanalysis performed on a specimen, in which the error of S up has been detected (an analysis of analysis result 963 of FIG. 18).

(2-1) When contact of nozzle 8 with droplet 610 inside piercer 7 as shown in FIG. 11 is detected by liquid surface sensor 82, nozzle 8 fails to suction an accommodation object, and controller 500 provides an error notification (e.g., a P mistake of FIG. 18 and a first error message of FIG. 19). Also, when collision of nozzle 8 with cover member 22 is detected as shown in FIG. 9B, nozzle 8 fails to suction an accommodation object, and controller 500 provides an error notification (e.g., a P mistake of FIG. 18 and a second error message of FIG. 19). The error notification is, for example, a notification indicating that piercer 7 has not pierced cover member 22.

With such a configuration, the user can check an error notification to recognize a factor by which the analysis apparatus has failed to suction an accommodation object (i.e., a factor that nozzle 8 has contacted droplet 610 inside piercer 7 or a factor that nozzle 8 has collided with cover member 22). The user can also recognize the factor at an early stage without directly checking analysis apparatus 1 and accommodation container 2. The user can thus recognize an analysis result without any delay by, for example, performing an operation of removing the factor. Also, nozzle 8 does not suction an accommodation object when nozzle 8 contacts droplet 610 inside piercer 7 or when nozzle 8 collides with cover member 22, and accordingly, analysis apparatus 1 can prevent idle suction of nozzle 8. If idle suction is performed, bad data about an analysis result may be provided, and user himself/herself has to request a reanalysis. As a result, the acquisition of an analysis result is delayed. In the present embodiment, idle suction can be prevented, thus preventing the acquirement of an analysis result from being delayed without causing the user to request a reanalysis.

In the present embodiment, an error notification due to contact of nozzle 8 with droplet 610 inside piercer 7 and an error notification due to collision of nozzle 8 with cover member 22 may be provided in the same manner or in different manners.

(2-2) As shown in FIG. 12, controller 500 determines that contact of nozzle 8 with droplet 610 inside piercer 7 has been detected, based on an amount of driving of nozzle 8 and an amount of driving based on the length of piercer 7 in the direction of extension.

With such a configuration, an error notification can be provided appropriately when contact of nozzle 8 with droplet 610 inside piercer 7 is detected.

(2-3) As shown in FIG. 25, controller 500 causes nozzle 8 to perform the resuction process when contact of nozzle 8 with droplet 610 is detected by liquid surface sensor 82.

With such a configuration, the process of causing nozzle 8 to suction an accommodation object again is performed when liquid surface sensor 82 detects contact of nozzle 8 with droplet 610, thus causing nozzle 8 to suction an accommodation object without any delay.

(2-4) When controller 500 detects a liquid surface inside piercer 7 (YES at step S6 of FIG. 23), controller 500 performs the process of step S12. In the process of step S12, controller 500 performs the resuction process until the number of times of the resuction process (the number of times of nozzle automation X in FIG. 25) reaches prescribed value Xth, as shown in step S206 of FIG. 25. After the number of times of the resuction process reaches prescribed value Xth, controller 500 provides an alarm notification as the error notification at step S210. With such a configuration, the user can recognize that the number of times of the resuction process of nozzle 8 has reached prescribed value Xth, based on the alarm.

(2-5) Controller 500 causes piercer 7 to perform the repiercing process when collision sensor 809 detects the collision of nozzle 8, as shown in FIG. 26.

When collision of nozzle 8 is detected by collision sensor 809, it is highly likely that piercer 7 will fail to pierce cover member 22. With such a configuration, controller 500 can thus cause piercer 7 to perform the repiercing process, to thereby cause piercer 7 to pierce cover member 22 appropriately.

(2-6) When controller 500 detects a collision of nozzle 8 inside piercer 7 (YES at step S18 of FIG. 23), controller 500 performs the process of step S20. In the process of step S20, as shown in step S126 of FIG. 26, controller 500 performs the repiercing process until the number of times of the repiercing process (the number of times of piercer automation Y of FIG. 26) reaches prescribed value Yth. After the number of times of the repiercing process reaches prescribed value Yth, an alarm notification is provided as an error notification at step S130. With such a configuration, the user can recognize that the number of times of the repiercing process of piercer 7 has reached prescribed value Yth, based on the alarm.

When controller 500 detects a liquid surface above the previous height (YES at step S246 of FIG. 24), controller 500 performs the process of step S254. In the process of step S254, controller 500 performs the resuction process until the number of times of the resuction process (number of times of nozzle automation Z of FIG. 25) reaches prescribed value Zth, as shown in step S2546 of FIG. 27. After the number of times of the resuction process reaches prescribed value Zth, an alarm notification is provided as an error notification at step S2550. With such a configuration, the user can recognize that the number of times of the resuction process of nozzle 8 has reached prescribed value Zth.

(2-7) Analysis apparatus 1 includes first storage device 5341 that stores information in which "a pulse number by which detection of a collision with cover member 22 is detected" is associated with each of two or more types of cover members 22 (e.g., see FIG. 10). Controller 500 obtains a type of cover member 22. When the amount of driving of nozzle 8 at the detection of nozzle 8 is an amount of driving associated with the obtained type of cover member 22, controller 500 determines that nozzle 8 has collided with cover member 22 and provides the second error notification. As described above, the second error notification is a notification indicating that piercer 7 has not pierced cover member 22.

With such a configuration, controller 500 can appropriately determine that nozzle 8 has collided with cover member 22 even in the case of a different type of cover member 22.

(2-8) Controller 500 provides an error notification (in the above example, P mistake) indicating that piercer 7 has not pierced cover member 22 when collision sensor 809 detects that nozzle 8 has collided with cover member 22. The user can thus recognize that piercer 7 has not pierced cover member 22.

(2-9) Analysis apparatus 1 includes collision sensor 709 (third sensor) that detects the state of non-piercing of piercer 7 into cover member 22, as described in Embodiment 3. Controller 500 provides a second error notification (e.g., display of the sixth error image described above) indicating that piercer 7 has not pierced cover member 22, based on the detection of the state of non-piercing.

With such a configuration, the user can recognize that piercer 7 has not pierced cover member 22 based on the second error notification.

(2-10) Even when piercer 7 is driven by an amount of the additional pulse number after the detection of the state of non-piercing of pierce 7 into cover member 22, controller 500 provides a second notification when collision sensor 709 detects the state of non-piercing.

With such a configuration, in the case where piercer 7 is driven by an amount of an additional pulse number even when the state of non-piercing of piecer 7 into cover member 22 has been detected, piercer 7 may pierce cover member 22. The case where the state of non-piercing of piercer 7 into cover member 22 has been detected and where collision sensor 709 has detected the state of non-piercing even when piercer 7 has been driven by an amount of the additional pulse number is a case where piercer 7 has not pierced cover member 22. Thus, in the case where the state of non-piercing of piercer 7 into cover member 22 has been detected and where collision sensor 709 has detected the state of non-piercing even when piercer 7 has been driven by an amount of the additional pulse number, the second error notification is provided. Thus, the second error notification can be provided appropriately.

(2-11) Second storage device 5342 is included that stores information in which an additional pulse number is associated with each of two or more types of cover members 22 (e.g., see FIG. 31). Controller 500 obtains a type of cover member 22, and with reference to this information, obtains an additional pulse number associated with the type of cover member 22.

With such a configuration, an additional pulse number can be set in accordance with, for example, the hardness of cover member 22, thereby driving piercer 7 in accordance with an ease of extension of cover member 22 (see FIG. 31).

(2-12) When the state of non-piercing is detected, controller 500 causes piercer 7 to perform the repiercing process and also provides the second error notification (e.g., display of the sixth error image described above).

With such a configuration, the process of causing piercer 7 to automatically pierce cover member 22 is performed, thus causing piercer 7 to pierce cover member 22 without any delay.

(2-13) Controller 500 performs the repiercing process until the number of times of the repiercing process (number of times of piercer automation Y of FIG. 26) reaches prescribed value Yth. After the number of times of the repiercing process reaches prescribed value Yth, controller 500 provides an alarm notification at step S210. With such a configuration, the user can recognize that the number of times of the repiercing process of piercer 7 has reached prescribed value Yth.

[Aspects]

A person skilled in the art will understand that the exemplary examples described above are specific examples of the aspects below.

(Item 1-1) An analysis apparatus performs a biochemical analysis of a specimen by reacting the specimen and a reagent in a reaction container. The analysis apparatus includes: a nozzle that suctions an accommodation object, which is the specimen or the reagent, from an accommodation container that accommodates the accommodation object; a sensor that detects contact of the nozzle with the accommodation object; a storage device; and a controller that controls the nozzle to move upward and downward, wherein the controller causes the nozzle to suction the accommodation object based on detection of the contact of the nozzle with the accommodation object, stores a height of the nozzle at the detection of the contact of the nozzle with the accommodation object in the storage device, detects an error based on a first height of the nozzle, which is obtained at the detection of the contact of the nozzle with the accommodation object by the sensor, being above a second height of the nozzle, which is a height of the nozzle at the previous detection of the contact of the nozzle with the accommodation object and is stored in the storage device, and upon detection of an error, provides an error notification in a manner different from that of the detection of another error.

With such a configuration, the analysis apparatus detects an error based on the most recent height of the nozzle, which is obtained at the detection of the contact of the nozzle with the accommodation object, being above the previous height of the nozzle, which is obtained at the previous detection. Further, upon detection of an error, the analysis apparatus provides the error notification in a manner different from that of the detection of another error. Thus, the user can recognize an error based on the height of the nozzle, which is obtained at the detection of the contact of the nozzle with the accommodation object, being above the height of the nozzle, which is obtained at the previous detection of the contact of the nozzle with the accommodation object.

(Item 1-2) In the analysis apparatus according to item 1-1, the controller provides the error notification when the first height is above the second height and the difference between the first height and the second height is not less than the threshold.

With such a configuration, for example, whether the first height is above the second height is determined, and when the first height is above the second height and the difference between the first height and the second height is not less than the threshold, the error notification is provided, thus appropriately providing the error notification.

(Item 1-3) In the analysis apparatus according to item 1-2, the controller accepts a change in the threshold.

With such a configuration, the user can change the threshold, leading to improved user's convenience.

(Item 1-4) In the analysis apparatus according to item 1-2 or item 1-3, the controller deletes the second height stored in the storage device after determining whether the first height is above the second height.

With such a configuration, a plurality of second heights can be prevented from remaining in the storage device, thus reducing the storage capacity of the storage device.

(Item 1-5) In the analysis apparatus according to any one of items 1-1 to 1-4, the controller performs the process of controlling the nozzle to suction the accommodation object again and also provides an error notification.

With such a configuration, the nozzle is caused to perform the process of suctioning the accommodation object again, thus causing the nozzle to suction the accommodation object without any delay.

(Item 1-6) In the analysis apparatus according to any one of items 1-1 to 1-5, the controller accepts an input whether to transmit the error notification to the external device that performs the error notification upon receipt of an error notification based on the error process.

With such a configuration, the user can select whether to transmit the error notification to the external device, leading to improved user's convenience.

(Item 1-7) In the analysis apparatus according to any one of items 1-1 to 1-6, the accommodation container has a cover member which is covered, and the biochemical analysis apparatus further includes a piercer for piercing the cover member, wherein the nozzle passes through the piercer which has pierced the cover member and suctions the accommodation object, and the error notification is a notification indicating a possibility that an air bubble of the accommodation object would have been detected in the accommodation container, the first height would be above the second height and the difference between the first height and the second height would not be less than a threshold, or the nozzle would have contacted the droplet of the accommodation object inside the piercer.

With such a configuration, the user can recognize that there is a possibility that the air bubble of the accommodation object would have been detected in the accommodation container, the first height would be above the second height and the difference between the first height and the second height would not be less than the threshold, or the nozzle would have contacted the droplet of the accommodation object inside the piercer.

(Item 1-8) The analysis apparatus according to any one of items 1-1 to 1-7 further includes an analysis mechanism that can analyze a specimen in accordance with a plurality of analysis categories, and a display device that displays identification information for identifying a specimen and the plurality of analysis categories, wherein the analysis mechanism analyzes the specimen in accordance with analysis categories other than an analysis category for which an error has been detected among the plurality of analysis categories, and upon detection of the error, the controller displays, as an error notification, error information in association with the specimen and also displays error information in association with the analysis category for which the error has been detected among the plurality of analysis categories, and displays at least one piece of error information among the error information associated with the specimen and the error information associated with the analysis category for which the error has been detected, in a manner different from that of error information indicating the detection of another error.

With such a configuration, upon detection of the error as described above, the specimen can be analyzed in accordance with analysis categories other than an analysis category for which the error has been detected among a plurality of analysis categories, and the user can recognize the above error in a manner more impressive than that of another error.

(Item 1-9) A biochemical analysis method of performing a biochemical analysis of a specimen by reacting the specimen and a reagent in a reaction container is provided. An apparatus that performs the biochemical analysis includes a nozzle that suctions an accommodation object, which is the specimen or the reagent, from an accommodation container that accommodates the accommodation object; a sensor that detects contact of the nozzle with the accommodation object; a storage device; and a controller that controls the nozzle to move upward and downward. The biochemical analysis method includes: causing the nozzle to suction an accommodation object upon detection of contact of the nozzle with the accommodation object by the sensor; storing a height of the nozzle at the contact of the nozzle with the accommodation object in the storage device; detecting an error based on a first height of the nozzle, which is obtained at the detection of the contact of the nozzle with the accommodation object by the sensor, being above a second height of the nozzle, which is a height of the nozzle at the previous detection of the contact of the nozzle with the accommodation object and is stored in the storage device; and upon detection of an error, providing an error notification in a manner different from that in the case of the detection of another error.

With such a configuration, the analysis apparatus detects an error based on the most recent height of the nozzle, which is obtained at the detection of the contact of the nozzle with the accommodation object, being above the previous height of the nozzle, which is obtained at the previous detection. Further, upon detection of an error, the analysis apparatus provides the error notification in a manner different from that in the case of the detection of another error. The user can thus recognize an error based on the height of the nozzle, which is obtained at the detection of the contact of the nozzle with the accommodation object, being above the height of the nozzle, which is obtained at the previous detection of the contact of the nozzle with the accommodation object.

(Item 2-1) An analysis apparatus performs a biochemical analysis of a specimen by reacting the specimen and a reagent in a reaction container. The analysis apparatus includes: an arrangement portion in which an accommodation container is arranged, the accommodation container accommodating an accommodation object which is the specimen or the reagent and including a cover member; a piercer for piercing the cover member; a nozzle that passes through the piercer which has pierced the cover member and suctions the accommodation object; a first sensor that detects contact of the nozzle with the accommodation object; a second sensor that detects a collision of the nozzle; and a controller that drives the nozzle and the piercer. The controller provides an error notification when the first sensor detects contact of the nozzle with a droplet of the accommodation object inside the piercer, and provides an error notification when the second sensor detects the collision of the nozzle with the cover member.

With such a configuration, the error notification is provided when the first sensor detects the contact of the nozzle with the droplet of the accommodation object inside the piercer, and the error notification is provided when the second sensor detects the collision of the nozzle with the cover member. Thus, the user can easily recognize a factor by which the analysis apparatus has failed to suction the accommodation object.

(Item 2-2) In the analysis apparatus according to item 2-1, the piercer extends, and the controller drives the nozzle in a direction of extension of the piercer, and determines that contact of the nozzle with the droplet inside the piercer has been detected based on an amount of driving of the nozzle and an amount of driving corresponding to a length of the piercer in the direction of extension.

With such a configuration, the error process can be performed appropriately when the contact of the nozzle with the droplet inside the piercer is detected.

(Item 2-3) In the analysis apparatus according to item 2-1 or item 2-2, the controller performs the resuction process of controlling the nozzle to suction the accommodation object again.

With such a configuration, an attempt is made to cause the nozzle to automatically suction the accommodation object again, thus allowing the nozzle to suction the accommodation object without any delay.

(Item 2-4) In the analysis apparatus according to item 2-3, the controller performs the resuction process until the number of times of the resuction process reaches the first prescribed number of times, and when the number of times of the resuction process reaches the first prescribed number of times, provides an error notification.

With such a configuration, the user can recognize, based on the error notification, that the number of times of the resuction process of the nozzle has reached the first prescribed number of times.

(Item 2-5) In the analysis apparatus according to any one of items 2-1 to 2-4, when the second sensor detects the collision of the nozzle, the controller performs the repiercing process of controlling the piercer to pierce the cover member again.

With such a configuration, an attempt is made to cause the piercer to automatically pierce the cover member again. This allows the nozzle to suction the accommodation object without any delay after causing the piercer to automatically pierce the cover member again.

(Item 2-6) In the analysis apparatus according to item 2-5, the controller performs the repiercing process until the number of times of the repiercing process reaches the second prescribed number of times, and provides the error notification when the number of times of the repiercing process reaches the second prescribed number of times.

With such a configuration, the user can recognize that the number of times of the repiercing process of the piercer has reached the second prescribed number of times, based on the error notification.

(Item 2-7) The analysis apparatus according to any one of items 2-1 to 2-6 further includes a first storage device that stores first information in which the amount of driving is associated with each of two or more types of cover members, wherein the controller obtains a type of the cover member, and when the amount of driving of the nozzle at the detection of the collision of the nozzle by the second sensor is the amount of driving associated with the obtained type of the cover member, determines that the nozzle has collided with the cover member.

With such a configuration, it can be determined that the nozzle has collided with the cover member.

(Item 2-8) In the analysis apparatus according to any one of items 2-1 to 2-7, the controller provides the error notification indicating that the piercer has not pierced the cover member when the second sensor detects the collision of the nozzle.

The case where the second sensor has detected the collision of the nozzle is assumed to be a case where the piercer has not pierced the cover member. With such a configuration, when the second sensor detects the collision of the nozzle, that is, when the piercer has not pierced the cover member, the user can recognize that the piercer has not pierced the cover member, based on the error notification.

(Item 2-9) The analysis apparatus according to any one of items 2-1 to 2-8 further includes a third sensor that detects a state of non-piercing of the piercer into the cover member, wherein the controller provides an error notification indicating that the piercer has not pierced the cover member, based on the state of non-piercing.

With such a configuration, the user can recognize that the piercer has not pierced the cover member, based on the error notification.

(Item 2-10) In the analysis apparatus according to item 2-9, even when the piercer is driven by a prescribed amount of driving after a state of collision of the piercer and the cover member has been detected by the third sensor, the controller provides an error notification when the state of non-piercing is detected by the third sensor.

With such a configuration, in the case where the piercer is driven by a prescribed amount of driving even when the collision between the piercer and the cover member has been detected, the piercer may pierce the cover member. The case where collision of the piercer with the cover member has been detected and where the second sensor has detected the collision even when the piercer has been driven by a prescribed amount of driving is a case where the piercer has not pierced the cover member. Thus, in the case where the collision of the piercer with the cover member has been detected and where the second sensor has detected the collision even when the piercer has been driven by a prescribed amount of driving, the second error process is performed. Thus, the second error process can be performed appropriately.

(Item 2-11) The analysis apparatus according to item 2-10 further includes a second storage device that stores information in which the prescribed amount of driving is associated with each of two or more types of cover members, wherein the controller obtains a type of the cover member, and obtains a prescribed amount of driving associated with the type of the cover member with reference to the information.

With such a configuration, for example, a prescribed amount of driving can be set in accordance with the hardness of the cover member, and the piercer can be driven in accordance with the hardness of the cover member.

(Item 2-12) In the analysis apparatus according to any one of items 2-9 to 2-11, when the state of non-piercing is detected, the controller performs a repiercing process of controlling the piercer to pierce the cover member again.

With such a configuration, an attempt is made to cause the piercer to automatically pierce the cover member again. This allows the nozzle to suction the accommodation object without any delay after causing the piercer to automatically pierce the cover member again.

(Item 2-13) In the analysis apparatus according to item 2-12, the controller performs the repiercing process until a number of times of the repiercing process reaches a third prescribed number of times, and provides an error notification when the number of times of the repiercing process reaches the third prescribed number of times.

With such a configuration, the user can recognize, based on the error notification, that the number of times of the automatic process of the piercer and the number of times of the automatic process of the nozzle reach the second prescribed number of times.

(Item 2-14) A biochemical analysis method of performing a biochemical analysis of a specimen by reacting the specimen and a reagent in a reaction container is provided. An apparatus that performs a biochemical analysis includes: an arrangement portion in which an accommodation container is arranged, the accommodation container accommodating an accommodation object which is the specimen or the reagent and including a cover member; a piercer for piercing the cover member; a nozzle that passes through the piercer which has pierced the cover member and suctions the accommodation object; a first sensor that detects contact of the nozzle with the accommodation object; a second sensor that detects a collision of the nozzle; and a controller that drives the nozzle and the piercer. The biochemical analysis method includes: providing an error notification when the first sensor detects contact of the nozzle with the droplet inside the piercer; and providing an error notification when the second sensor detects a collision of the nozzle with the cover member.

With such a configuration, the error notification is provided when the first sensor detects contact of the nozzle with the droplet of the accommodation object inside the piercer, and the error notification is provided when the second sensor detects a collision of the nozzle with the cover member. The user can thus easily recognize a factor by which the analysis apparatus has failed to suction the accommodation object.

Although the embodiments of the present invention have been described and illustrated in detail, it is clearly understood that the same is by way of illustration and example only and is not to be taken by way of limitation, the scope of the present invention being interpreted by the terms of the appended claims.

What is claimed is:

1. A biochemical analysis apparatus that performs a biochemical analysis of a liquid specimen by reacting the specimen and a liquid reagent in a reaction container, the biochemical analysis apparatus comprising:
   an arrangement portion in which an accommodation container is arranged, the accommodation container accommodating an accommodation object which is the specimen or the reagent and including a cover member;
   a piercer configured to pierce the cover member;
   a nozzle configured to pass through the piercer which has pierced the cover member and suction the accommodation object;
   a first sensor configured to detect contact of the nozzle with the accommodation object;
   a second sensor configured to detect a collision of the nozzle; and
   a controller configured to drive the nozzle and the piercer, wherein the controller is further configured to:
   provide an error notification when the first sensor detects contact of the nozzle with a droplet of the accommodation object inside the piercer, and
   provide an error notification when the second sensor detects a collision of the nozzle with the cover member.

2. The biochemical analysis apparatus according to claim 1, wherein
   the piercer extends, and
   the controller is further configured to:
      drive the nozzle in a direction of extension of the piercer, and
      determine that the contact of the nozzle with the droplet inside the piercer has been detected, based on an amount of driving of the nozzle and an amount of driving corresponding to a length of the piercer in the direction of extension.

3. The biochemical analysis apparatus according to claim 1, wherein the controller is further configured to perform a resuction process of controlling the nozzle to suction the accommodation object again when the first sensor detects the contact of the nozzle with the droplet.

4. The biochemical analysis apparatus according to claim 3, wherein the controller is further configured to:
   perform the resuction process until a number of times of the resuction process reaches a first prescribed number of times, and
   provide an error notification when the number of times of the resuction process reaches the first prescribed number of times.

5. The biochemical analysis apparatus according to claim 1, wherein when the second sensor detects the collision of the nozzle, the controller is further configured to perform a repiercing process of controlling the piercer to pierce the cover member again.

6. The biochemical analysis apparatus according to claim 5, wherein the controller is further configured to:
   perform the repiercing process until a number of times of the repiercing process reaches a second prescribed number of times, and
   provide an error notification when the number of times of the repiercing process reaches the second prescribed number of times.

7. The biochemical analysis apparatus according to claim 1, further comprising a first storage configured to store first information in which an amount of driving is associated with a first cover member and a second cover member,
   wherein the controller is further configured to:
      obtain whether the cover member is the first cover member or the second cover member, and
      determine that the nozzle has collided with the cover member when an amount of driving of the nozzle at the detection of the collision of the nozzle by the second sensor is an amount of driving associated with the obtained first cover member or second cover member.

8. The biochemical analysis apparatus according to claim 1, wherein when the second sensor detects the collision of the nozzle, the controller is further configured to provide an error notification indicating that the piercer has not pierced the cover member.

9. The biochemical analysis apparatus according to claim 1, further comprising a third sensor configured to detect a state of non-piercing of the piercer into the cover member,
   wherein the controller is further configured to provide, based on detection of the state of non-piercing, an error notification indicating that the piercer has not pierced the cover member.

10. The biochemical analysis apparatus according to claim 9, wherein even when the piercer is driven by a prescribed amount of driving after the detection of a state of collision of the piercer and the cover member by the third sensor, the controller is further configured to provide an error notification when the third sensor detects the state of non-piercing.

11. The biochemical analysis apparatus according to claim 10, further comprising a second storage configured to store information in which the prescribed amount of driving is associated with a first cover member and a second cover member,
   wherein the controller is further configured to:
      obtain whether the cover member is the first cover member or the second cover member, and
      obtain the prescribed amount of driving associated with the obtained first cover member or the second cover member with reference to the information.

12. The biochemical analysis apparatus according to claim 9, wherein when the state of non-piercing is detected, the controller is further configured to perform a repiercing process of controlling the piercer to pierce the cover member again.

13. The biochemical analysis apparatus according to claim 12, wherein the controller is further configured to:
   perform the repiercing process until a number of times of the repiercing process reaches a third prescribed number of times, and
   provide an error notification when the number of times of the repiercing process reaches the third prescribed number of times.

* * * * *